(12) United States Patent
Nessel et al.

(10) Patent No.: US 9,819,475 B1
(45) Date of Patent: Nov. 14, 2017

(54) WIRELESS NANOIONIC-BASED RADIO FREQUENCY SWITCH

(71) Applicants: James A. Nessel, Cleveland, OH (US); Felix A Miranda, Olmsted Falls, OH (US)

(72) Inventors: James A. Nessel, Cleveland, OH (US); Felix A Miranda, Olmsted Falls, OH (US)

(73) Assignee: The United States of America as Represented by the Administrator of National Aeronautics and Space Administration, Washington, DC (US)

(*) Notice: Subject to any disclaimer, the term of this patent is extended or adjusted under 35 U.S.C. 154(b) by 0 days.

(21) Appl. No.: 15/293,711

(22) Filed: Oct. 14, 2016

Related U.S. Application Data

(63) Continuation of application No. 13/645,799, filed on Oct. 5, 2012, now Pat. No. 9,491,118.

(60) Provisional application No. 61/620,100, filed on Apr. 4, 2012.

(51) Int. Cl.
*H04L 12/931* (2013.01)
*H04L 5/14* (2006.01)
*H04B 1/38* (2015.01)

(52) U.S. Cl.
CPC . *H04L 5/14* (2013.01); *H04B 1/38* (2013.01)

(58) Field of Classification Search
CPC .................................................. H01L 45/1266
See application file for complete search history.

(56) References Cited

U.S. PATENT DOCUMENTS

| | | | |
|---|---|---|---|
| 7,923,715 B2 | 4/2011 | Nessel et al. | |
| 2010/0109656 A1* | 5/2010 | Wang | G01R 33/098 324/210 |
| 2010/0140582 A1* | 6/2010 | Nessel | H01L 45/00 257/4 |
| 2011/0269397 A1* | 11/2011 | Bella | H04B 7/15507 455/11.1 |
| 2011/0278528 A1* | 11/2011 | Lung | H01L 27/2454 257/2 |

OTHER PUBLICATIONS

Park, Ji-Yong, Han, Sang-Min, and Itoh, Tetsuo; "A Rectenna Design With Harmonic-Rejecting Circular-Sector Antenna"; IEEE Antennas and Wireless Propagation Letters, vol. 3, 2004.
McSpadden, James O., Fan, Lu, and Chang, Kai; Design and Experiments of a High-conversion-Efficienty 5.8-GHz Rectenna; IEEE Transactions on Microwave Theory and Techniques, vol. 46, No. 12, Dec. 1998, pp. 2053-2060.

(Continued)

*Primary Examiner* — Jay P Patel
(74) *Attorney, Agent, or Firm* — Robert H. Earp, III

(57) ABSTRACT

A nanoionic switch connected to one or more rectenna modules is disclosed. The rectenna module is configured to receive a wireless signal and apply a first bias to change a state of the nanoionic switch from a first state to a second state. The rectenna module can receive a second wireless signal and apply a second bias to change the nanoionic switch from the second state back to the first state. The first bias is generally opposite of the first bias. The rectenna module accordingly permits operation of the nanoionic switch without onboard power.

8 Claims, 17 Drawing Sheets

(56) References Cited

OTHER PUBLICATIONS

Nessel, James A., Lee, Richard O., Mueller, Carl H., Koxicki, Michael N., Ren, Minghan, and Morse, Jacki; "A Novel Nanoionics-based Switch for Microwave Applications"; IEEE 2008, 978-4244-1780-3/08/$25.00; pp. 1051-1054.
Yadav, Rakesh Kumar, Yadava, R. L., and Das, Sushrut; "The Rectennas—A progressive study"; ISSN: 2229-6646 (online) International Journal of Science Technology and Management (IJSTM), vol. 2 Issue 3, Jul. 2011 www.ijstm.com; pp. 119-126.

* cited by examiner

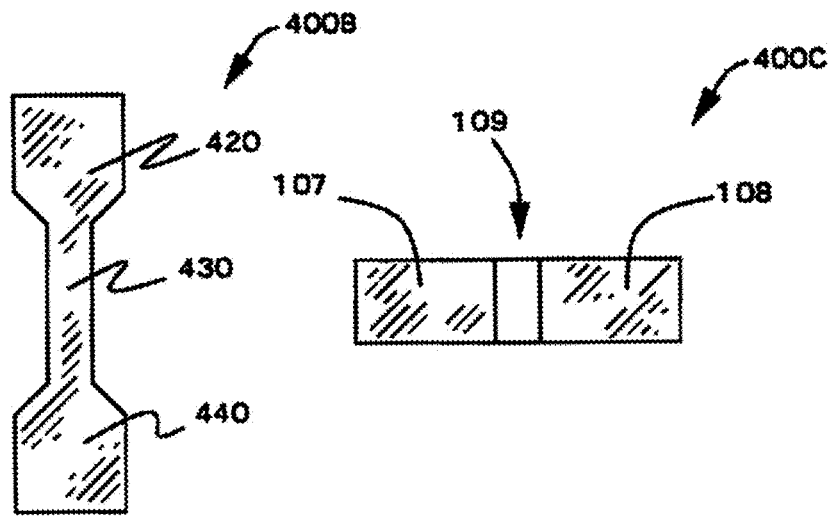
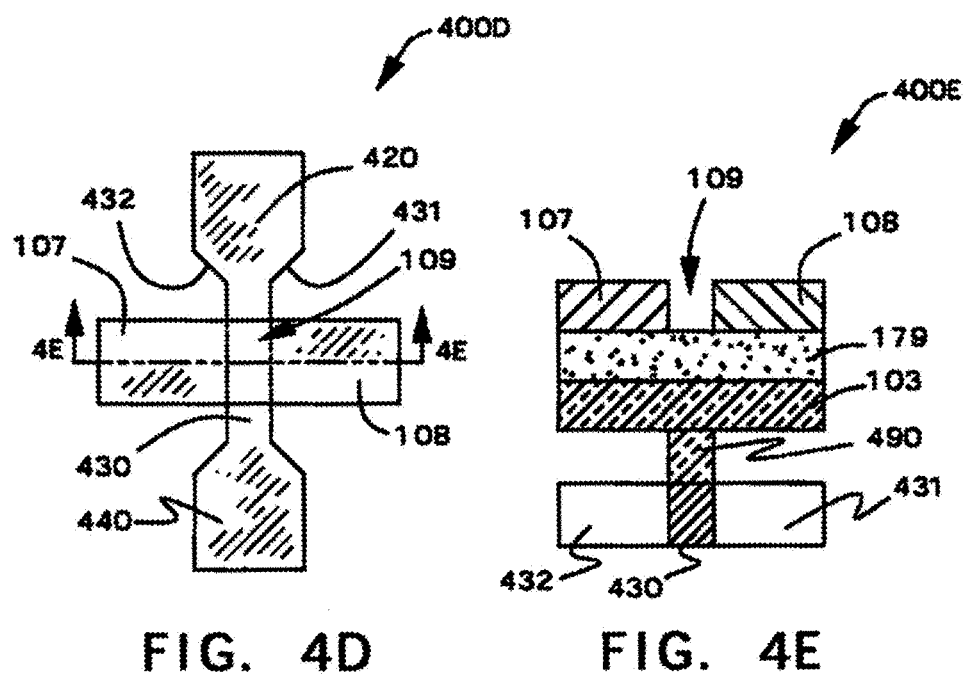
FIG. 4B  FIG. 4C
FIG. 4D  FIG. 4E

|  | MEMS | Solid State | Nanoionics |
|---|---|---|---|
| Frequency Range | DC to 70 GHz | DC to 20 GHz | DC to 6 GHz |
| Insertion Loss (avg) | 0.1 dB | 0.5 dB | 0.5 dB |
| Isolation (avg) | 40 dB | 30 dB | 35 dB |
| Actuation Voltage | 5 - 50 V | 3 - 5 V | 1 V |
| Power Consumption | μW | mW | μW |
| Energy Consumption | 0.1 – 10 μJ | μJ - mJ | 100 nJ |
| Power Handling | 1 - 20 W | 1 - 10 W | 0.5 W |
| Intermodulation Distortion | +80 dBm | +70 dBm | +75 dBm |
| Switching Speed | 1 – 200 μs | 10 - 100 ns | < 1 – 10 μs |
| Size | $\mu m^2$ | $nm^2 - \mu m^2$ | $nm^2 - \mu m^2$ |
| Unit Cost | ~ $5 | ~ $0.50 | ~ $0.50 |

FIG. 8

WIRELESS NANOIONIC-BASED RADIO FREQUENCY SWITCH

CROSS REFERENCE TO RELATED APPLICATIONS

This application is a Continuation application claiming the benefit of priority from U.S. patent application Ser. No. 13/645,799, filed on Oct. 5, 2012, pending, which claims priority to U.S. Patent Application No. 61/620,100, entitled "Wireless Controlled Chalcogenide Nanoionic Radio Frequency Switch," filed on Apr. 4, 2012, each of which is hereby incorporated by reference in its entirety.

This application is related to U.S. Pat. No. 7,923,715, issued on Apr. 12, 2011, entitled "Chalcogenide Nanoionic-Based Radio Frequency Switch," is hereby incorporated by reference in its entirety, and is commonly assigned to the assignee of this application.

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

BACKGROUND OF THE DISCLOSURE

Radio frequency switches are basic building blocks for communication and control systems and are used for multiplexing of signals to achieve system reconfigureability and dynamic control. Radio frequency switches may be used in such applications as portable/mobile/satellite communication systems (e.g. cell-phones, PDAs, laptops, phased array antennas, sensors, transceivers etc.). As communication systems approach higher data rate (gigabytes per second) and multi-functional operation, stringent requirements have been set for radio frequency switches. Some of these requirements include low power consumption, high reliability, high switching speed, high isolation, low insertion losses, ease of integration/implementation, as well as affordability. In particular, for 3G (third generation) wireless phones and space-based applications, low power consumption is critical to ensure reliable, long lifetime operation on limited power supplies. MEMS or solid-state based switches which are currently used are incapable of meeting future demands due to associated disadvantages. For example, MEMS devices utilize complicated manufacturing processes and are expensive to manufacture. FIG. 8 is a table comparing electronic, physical and cost properties of MEMS, solid state, and nanoionic switches.

Known radio frequency devices employ electronic, mechanical, or a combination of electronic and mechanical (electromechanical) processes to induce a change in state (on/off). Radio frequency switching applications usually employ solid state switches or microelectromechanical systems (MEMS), both of which possess associated weaknesses. Solid state diodes can be produced cost-effectively to operate at low voltages (1-3V) and high speeds (ns), but suffer from higher insertion loss, high DC power consumption, low isolation, and the generation of third-order harmonics/intermodulation distortion (IMD). MEMS-based switches provide low insertion loss (about 0.2 dB), low DC power consumption (about pW), high isolation (>30 dB), and good IMD performance, but exhibit reliability problems (e.g., stiction, moving parts), slower switching speeds (μs), high actuation voltages (5-50V) which require complex circuitry, and relatively complicated processing steps. Furthermore, MEMS packaging presents additional problems which need to be addressed before widespread use is realizable.

Advances in the area of radio frequency switches will be beneficial in various industries. The present disclosure addresses embodiments that may be applicable to switches, such as radio switches.

SUMMARY OF THE INVENTION

A method of wirelessly transmitting a first signal at a first frequency is disclosed herein. The method includes receiving the signal at a first antenna and applying a first bias based on the first signal across a nano-ionic switch. The first bias changes a state of the nano-ionic switch from a first state to a second state.

A method comprising wirelessly transmitting a signal at a first frequency is disclosed. The method includes receiving the signal at a rectenna module and converting the signal to electrical current at the rectenna module. The method further includes directing the electrical current to a nano-ionic switch wherein the electrical current changes a state of the nano-ionic switch from a first state to a second state or vice versa.

A system is also disclosed comprising a rectenna module having an antenna and a rectifier configured to receive a first radio wave signal at a first frequency and convert the radio wave signal into electrical current. The system can also include a nano-ionic switch connected to the rectenna module. The nano-ionic switch has an oxidizable electrode and an inert electrode positioned on chalcogenide glass such that a gap exists between the oxidizable electrode and the inert electrode. Receipt of the current at the nano-ionic switch causes the oxidizable electrode and the inert electrode form a conductive bridge at the gap without any power source.

BRIEF DESCRIPTION OF THE DRAWINGS

FIG. 4B is a top schematic view of a lower plate of a nanoionic capacitor.

FIG. 4C is a top schematic view of a nanoionic switch that forms one of the two capacitor plates of the example of the nanoionic capacitor schematically illustrated in FIGS. 4B-4E.

FIG. 4D is a top schematic view of the capacitor plates illustrated in the overlapping position crossing each other in an orthogonal relationship.

FIG. 4E is a cross-sectional view of the nanoionic capacitor of FIG. 4D taken along the lines 4E-4E.

FIG. 8 is a table comparing electronic, physical and cost properties of MEMS, solid state, and nanoionics switches.

DESCRIPTION OF EMBODIMENTS OF THE DISCLOSURE

The present disclosure sets forth embodiments as examples of those inventions set forth in the claims section. More specifically, the present disclosure relates to a nanoionic switch that may be used in various applications. No term or phrase in the Description section is meant to limit any claim term unless specifically set forth in the claims section. Those having ordinary skill in the art will appreciate alternatives to the disclosure set forth herein are possible without departing from the inventive concepts contained herein.

The fundamental operation of the nanoionic switch is rooted in the phenomenon of ion conduction in solid electrolytes. Comparable to liquid electrolytes (e.g., lead-acid batteries), solid electrolytes consist of mobile ions which undergo oxidation/reduction reactions at the anode (oxidizable electrode) and cathode (inert electrode) of the system. The fundamental difference between solid electrolyte and liquid electrolyte behavior is that the mobile ions are of a single polarity while the opposite polarity species remain fixed. The fixed ions essentially create a solid matrix in which mobile ions can "hop" into neighboring potential wells. Based on this short-range hopping mechanism for conduction, the ionic conductivity of solid electrolytes can approach electronic conductivity levels in semiconductors. See, "Devices Based on Mass Transport in Solid Electrolytes," Michael N. Kozicki and Maria Mitkova, Center for Applied Nanoionics, Arizona State University. Advantageously, the electrochemical resistance-change process may be performed with minimal energy.

Figure 1:
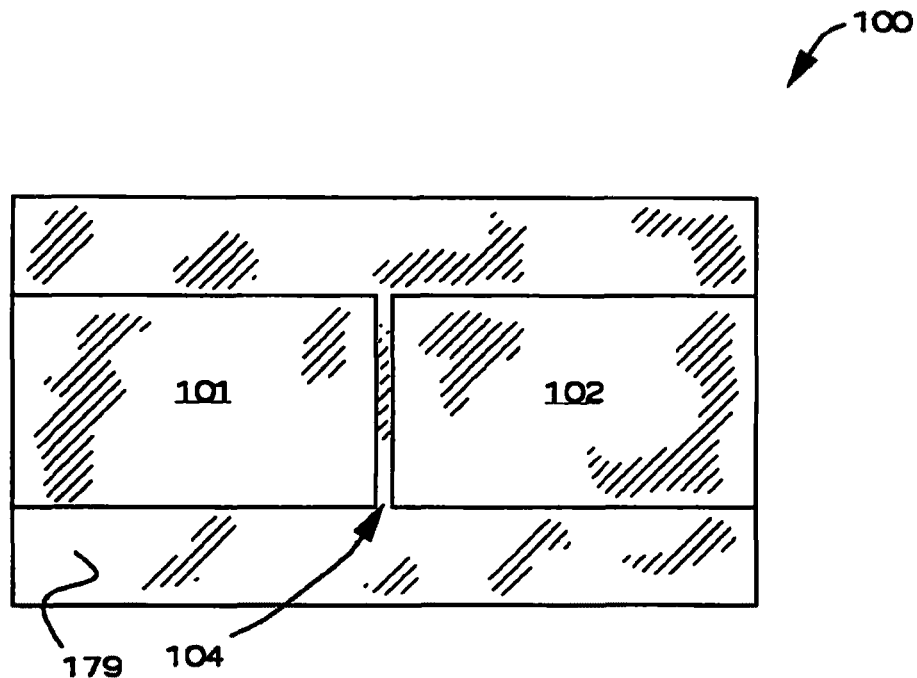
FIG. 1 is a schematic top view of a first example of a nanoionic switch.

FIG. 1 is a schematic view of a first example of a nanoionic switch 100. The fabrication of the nanoionics-based switch 100 can include a substrate 103, as shown in FIGS. 1D and 1E. The substrate 103 can have a relatively high resistivity, such as a silicon wafer or other substance with a relatively high resistance, such as a resistance greater than 1000 Ohm per centimeter. A base material 179 may be positioned on the substrate 103. The base material 179 may comprise one or more layers, or a ternary. In an embodiment, the base material 179 includes a layer of a glass material, such as chalcogenide glass.

Many inorganic and organic materials could be used as the base material 179 to conduct ions to at least some extent. Compounds of elements in the column of the periodic table headed by oxygen, the so-called chalcogens, are useful in electrochemical switching devices and/or the switch 100. Chalcogens can be used because of their high ion availability and mobility at normal device operating temperatures. As an embodiment, the chalcogenide glass may be utilized as the base material 179. For example, the chalcogenide glass can comprise a binary chalcogenide glass utilizing elements in column IV and/or VI of the periodic table, including but not limited to germanium, selenium, sulfur, silicon, oxygen amongst the other elements in those columns and other elements having similar properties for the given application. Stable binary glasses typically involve a group IV or group V atom, which non-limiting examples of the binary chalcogenide glass include but are not limited to germanium-selenium, germanium-sulfur, silicon-oxygen. In an embodiment where germanium and selenium are used, the germanium and selenium content of the binary may range from 30 to 40 percent by weight. Non-oxide glasses are more rigid than organic polymers but more flexible than a typical oxide glass. The flexibility of these materials offers the possibility of the formation of voids through which the ions can readily move from one equilibrium position to another.

Electrodes may be formed at opposing ends of the base material 179 whereby ions from at least one of the electrodes is capable of moving toward the other electrode. For example, a first electrode 101, a second electrode 102 and a gap 104 therebetween are illustrated in FIG. 1. In the embodiment of FIG. 1, the gap 104 can have a length of approximately 10 micrometers (μm). Of course, the size of the gap 104 may be any size as required by the nanoionic switch 100. The first electrode 101 may be an oxidizable electrode and may be positioned adjacent one end of the base material 179. The second electrode 102 may be an inert electrode and may be positioned adjacent an opposite end of the base material 179 such that the gap 104 is formed between the first electrode 101 and the second electrode 102.

The base material 179 may be positioned between the substrate 103 and the electrodes 101, 102.

The first electrode 101 and the second electrode 102 may have one or more metallic layers, which can be deposited atop the base material 179. Dissimilar metals can be used for the electrodes 101, 102. For example, the first electrode 101 may be an oxidizable metal, such as silver, and the second electrode 102 may be an inert metal, such as tungsten or nickel. A person having ordinary skill in the art will appreciate that the present disclosure may utilize other materials for the substrate 103, the base material 179 and the electrodes 101, 102. In an embodiment, the switch 100 includes a passivation layer to protect the layers of the switch 100 from the environment.

When a metal ion is introduced into the chalcogenide glass, the ions nucleate on the chalcogen-rich regions within the chalcogenide glass, resulting in a ternary that takes the form of a dispersed nanoscale metal ion-rich phase in a continuous glassy matrix. This allows the electrolyte to have a relatively high resistivity (necessary for a high off resistance state), while containing large quantities of highly mobile metal ions for conduction.

As a non-limiting example, "[t]he addition of Ag (or Cu) to the chalcogenide base glass can be achieved by diffusing the mobile metal from a thin surface film via photo dissolution. The process utilizes light energy greater than the optical gap of the chalcogenide glass to create charged defects near the interface between the reacted and unreacted chalcogenide layers. The holes created are trapped by the metal while the electrons move into the chalcogenide film. The electric field formed by the negatively charged chalcogen atoms and positively charged metal ions is sufficient to allow the ions to overcome the energy barrier at the interface and so the metal moves into the chalcogenide. Prior to the introduction of the metal, the glass consists of $GeS_4$ tetrahedra and, in the case of chalcogen-rich material, S (Se) chains. The introduced metal will readily react with the chain chalcogen and some of the tetrahedral material to form the ternary. This Ag chalcogen reaction, which essentially nucleates on the chalcogen-rich regions within the base glass, results in the nanoscale phase-separated ternary." See, "Devices Based on Mass Transport in Solid Electrolytes," Michael N. Kozicki and Maria Mitkova, Center for Applied Nanoionics, Arizona State University.

In an embodiment, the electrodes 101, 102 are approximately 1.5-2 µm thick and the base material 179 is approximately 100 nm thick. The base layer 179 is illustrated as applied to the substrate 103. In an embodiment where silver is used as a metallic layer, appropriate amounts and thicknesses of silver film is used such that the photodissolution of the silver will completely saturate the base material 179. In other words, the base material 179 of FIG. 1 is completely saturated.

Figure 1A:
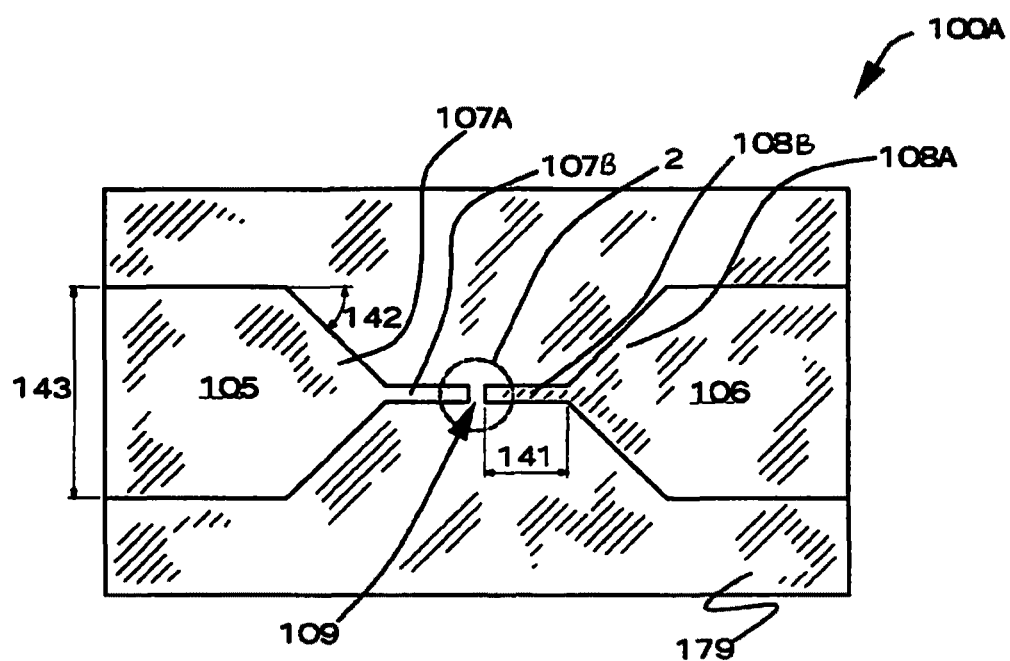
FIG. 1A is a schematic top view of a second example of a nanoionic switch that illustrates electrodes with a gap therebetween.

FIG. 1A is a schematic top view of a second example of a nanoionic switch 100A which illustrates narrow portions 107B, 108B of electrodes 105, 106. The electrode 105, 106 may be or the electrodes 101, 102 or have similar structure to the electrodes 101, 102. In an embodiment, the electrode 105 is a silver electrode (oxidizable), and the electrode 106 is the nickel (inert) electrode. In the embodiment shown, a width 143 of the electrodes 105, 106 can be approximately 1 millimeter (mm). The electrodes 105, 106 may include tapered portions 107A, 108A which may be tapered at an angle 142, as shown in FIG. 1A. The angle 142 may be less than 90 degrees, such as less than 45 degrees, including approximately 225 degrees as shown in FIG. 1A. The tapered portions 107A, 108A may extend toward elongated narrow portions 107B, 108B. For example, in an embodiment, a length 141 of the elongated narrow portions 107B, 108B as shown in FIG. 1A may be approximately 50 µm. Further, in this embodiment, a width of the narrow portions 107B, 108B may be approximately 10 µm, but a person having ordinary skill in the art will appreciate various dimensions of the narrow portions 107B, 108B may be utilized effectively. As a non-limiting example, the narrow portions 107B, 108B may be equal or less than 10 µm wide, and, in an embodiment, the width may range from 2-10 µm. The angle 142, the width 143 of the electrodes 105, 106, and the length and width of the elongated extensions 107, 108 can be sized as will be required by the application of the switch 100. For example, the size of the electrodes 105, 106 and/or the elongated extension 107, 108 can be configured for frequency operation in the range of 1 MHz to 6 GHz. Other considerably different geometries may be used without departing from the spirit and the scope of the disclosure as set forth herein for frequencies of operation outside the range specified herein.

Figure 2:
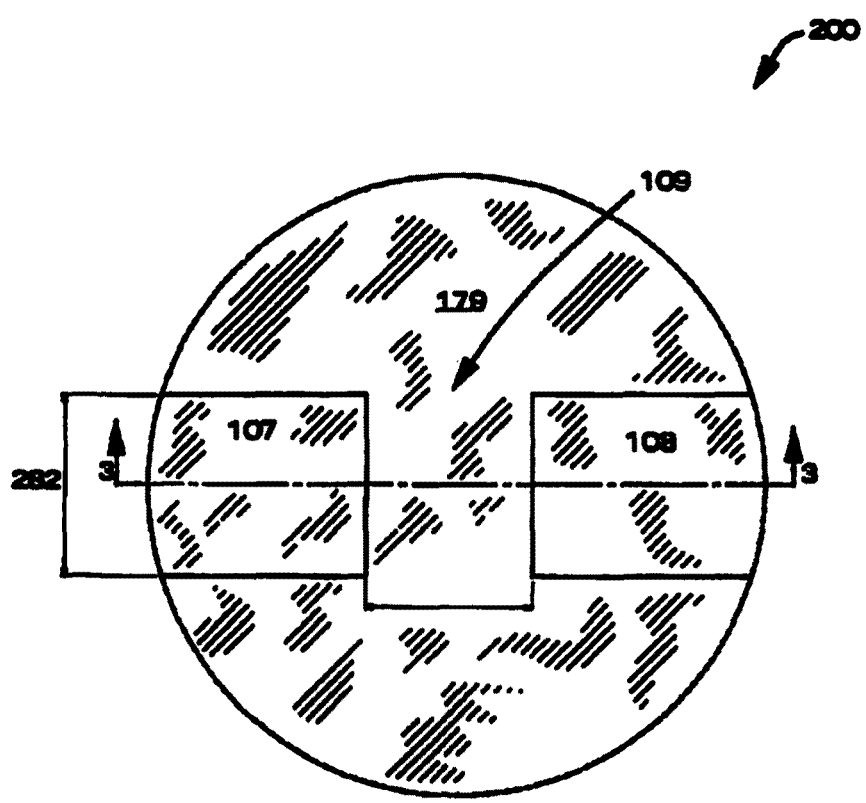
FIG. 2 is an enlargement of a portion of FIG. 1A illustrating a gap between the electrodes.

A gap 109 may be positioned between the elongated narrow portions 107B, 108B. For example, the elongated narrow portion 107B, 108B may extend toward each other but terminate such that the gap 109 is formed therebetween. The gap 109 may be approximately 10 µm, in one such embodiment, for example. FIG. 2 is an enlargement of a portion 200 of FIG. 1A illustrating the gap 109 between the electrodes 107, 108. The width 282 of the gap 109 is shown in FIG. 2.

The electrodes 105, 106, the tapered portions 107A, 108A thereof and the elongated narrow extensions 107B, 108B thereof may be metallic plated 106A, such as gold plated. Reference numeral 106A is used in FIGS. 3 and 3A to illustrate the metallic plating (for example, coating) of the electrodes 105, 106. It should be noted that the electrodes 101, 102 in FIGS. 1A, 1B and 1C, may have metallic plating even though such embodiments are not illustrated as such, for the sake of clarity.

Figure 1B:
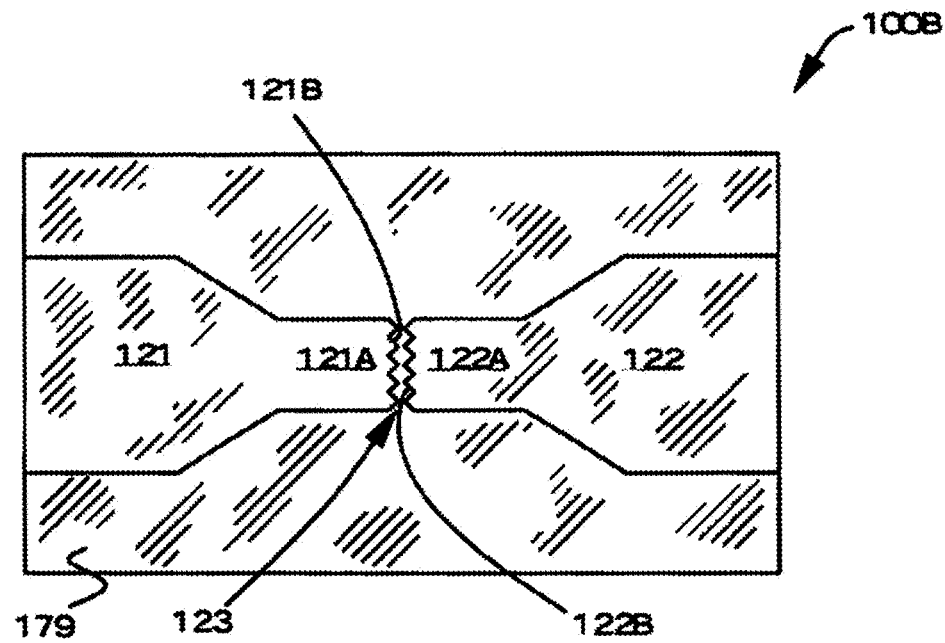
FIG. 1B is a schematic top view of a third example of a nanoionic switch that illustrates electrodes with serrated edges opposed from one another.

FIG. 1B is a schematic top view of a third example of a nanoionic switch 100B which illustrates electrodes 121, 122 having serrated edges 121B, 122B opposed from one another. It will be noted that the serrations of the serrated edges 121B, 122B are matched peak to peak such that the smallest gap 123 is created between peaks and the gap being slightly larger from valley to valley. Still referring to FIG. 1B, the oxidizable electrode 121 and the inert electrode 122 are illustrated. Tapered portions are illustrated as extending to elongated extensions 121A, 122A.

Figure 1C:
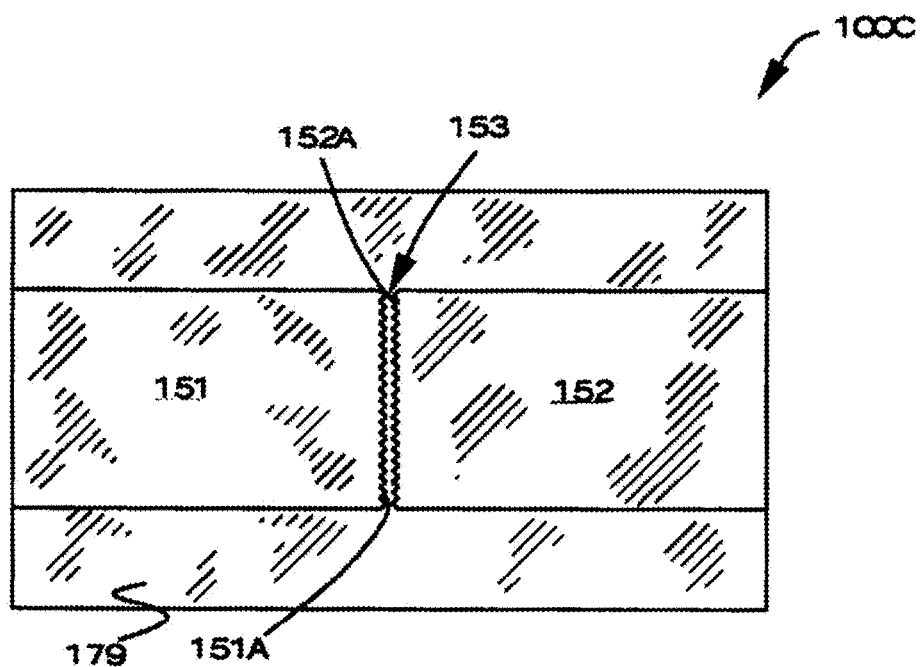
FIG. 1C is a schematic top view of a fourth example of a nanoionic switch that illustrates electrodes with serrated edges of a higher frequency than that of FIG. 1B.
Figure 1D:
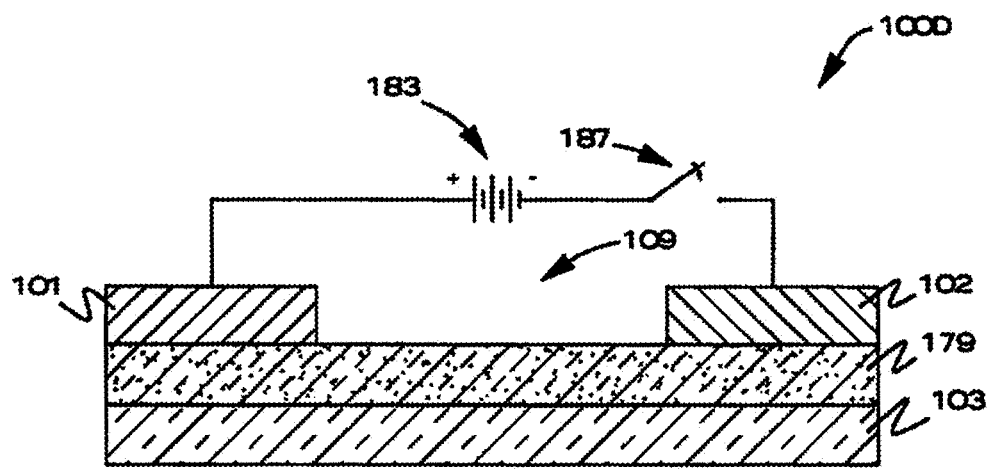
FIG. 1D is a schematic cross-sectional view of a substrate, solid electrolyte, electrodes and a direct current voltage source.
Figure 1E:
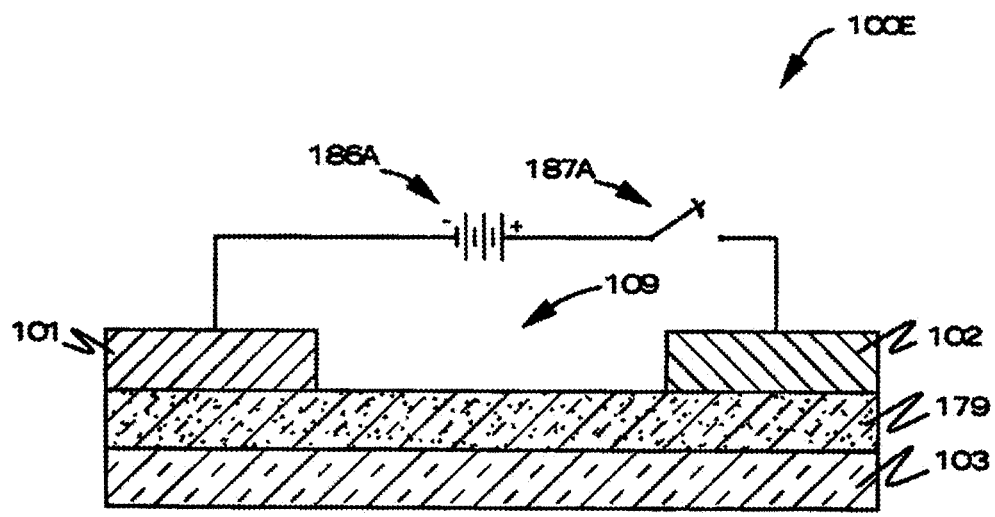
FIG. 1E is a schematic cross-sectional view of a substrate, solid electrolyte, electrodes and a direct current voltage source having an opposite bias from that of FIG. 1D.

FIG. 1C is a schematic top view of a fourth example of a nanoionic switch 100C which illustrates electrodes 151, 152 having serrated edges 151A, 152A of a higher frequency than that shown in FIG. 1B. The serrated edges 151A and 152A indicate a minimum gap 153 at the peaks thereof as opposed from one another. Further, the electrode 151 can be an oxidizable electrode and the electrode 152 can be an inert electrode. In this embodiment, the electrode 151 may be silver, and the electrode 152 may be nickel. As in the examples illustrated in FIGS. 1, 1A, and 1B, the electrodes 151, 152 can be positioned on the base material 179, such as a chalcogenide glass ternary, which may be doped with a metal, such as silver. For example, doping the chalcogenide ternary with metal, such as silver may be performed via photo-dissolution as discussed herein.

Electrolytes can be formed in a two-step process in which the base material 179, such as the chalcogenide glass can be deposited onto the substrate 103. Next, a metallic film is applied thereto. Then, as one example of how to migrate the metallic ions into the base material 179, such as the glass matrix of the chalcogenide ternary, the metal may deposited atop the glass matrix and exposed to light to induce a photo-dissolution process, such as by utilizing ultraviolet light. The metallic ions can then migrate into the glass matrix providing the framework for ionic transport and the capability of switching between states, such as a low-loss "on" state and a high isolation "off" state. The glass deposition can be evaporated in a vacuum performed at or near room temperature, for example.

As one non-limiting example of the photo-dissolution process that may be used for the nanoionic switch 100, 100A, 100B, 100C, an ultraviolet source may be applied for a period of time. As an example, the ultraviolet source may have a wavelength of about 405 nanometers (nm) and a power density of approximately 5 mW/cm$^2$ and may be applied for a predetermined amount of time, such as about ten minutes. The metallic film thickness may be such that sufficient light can penetrate to the interface to stimulate the photo-dissolution process in a reasonable time. For example, the metallic film thickness can be less than 25 nm to permit the photo-dissolution process in a reasonable time, but may be adjusted as needed. "Saturation" of the base material 179 in an embodiment where the base material 179 is the chalcogenide glass ternary set forth herein can occur when the diffusing metallic film reacts with substantially, if not all, of the available chalcogen atoms. Accordingly, the amount of metallic film at saturation can depend on the amount of chalcogen of the base material 179. As a non-limiting example, a 20 nm thick metallic film can completely saturate a 50 nm thick base material 179 when the photo-dissolution is completed. "Sub-saturated" electrolytes support electro-deposition but growth rates are typically reduced as there is less metal available. Electrolyte films as thin as 10 nm can be used for surface electro-deposition. Metallic deposition may also be performed using evaporation without breaking vacuum so as to prevent the formation of an oxide diffusion barrier on the surface of the glass. The thicknesses of both layers will largely depend on device performance requirements.

Figure 2A:
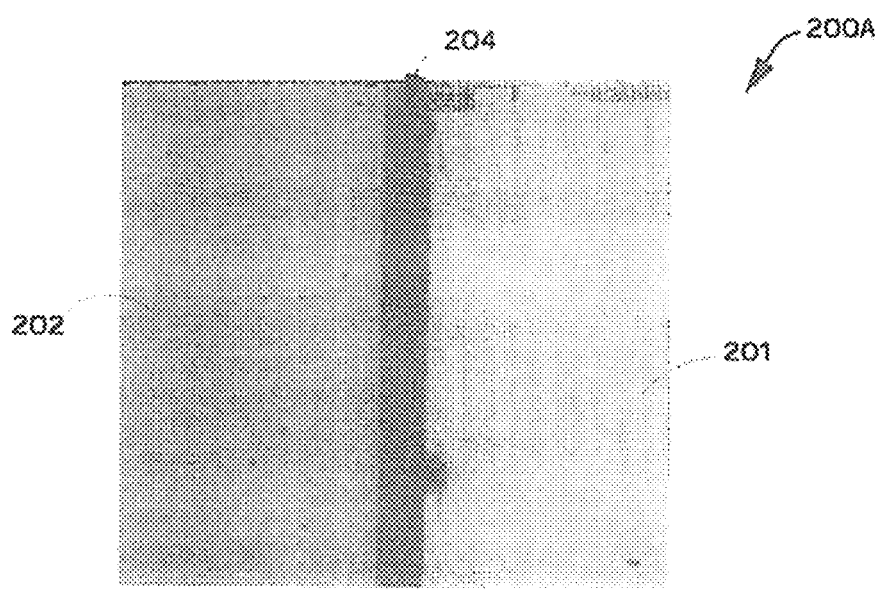
FIG. 2A is a microphotograph of a portion of an oxidizable electrode, an inert electrode and a gap of a nanoionic switch (depicted schematically in FIG. 1) in the "off" state (switch is open).
Figure 2B:
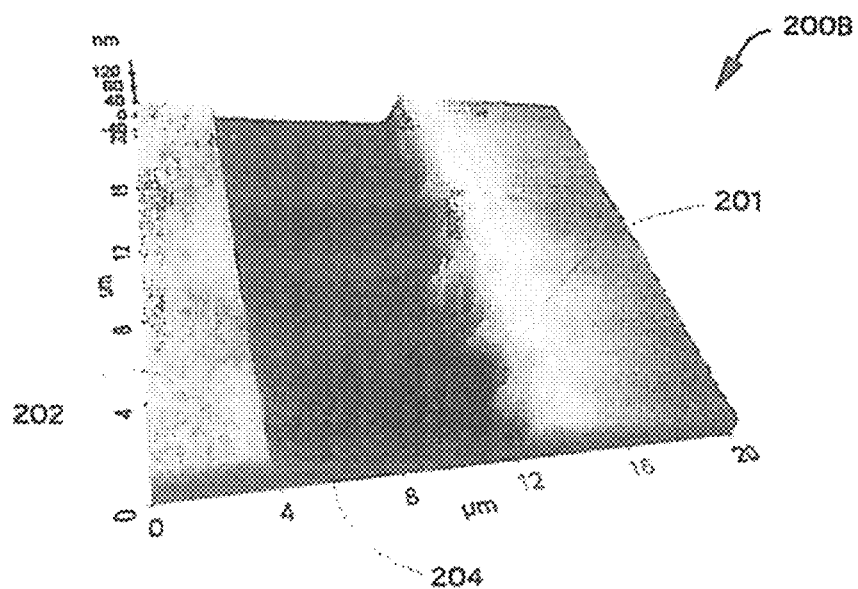
FIG. 2B is an atomic force microscopic image of a portion of a gap and electrodes of the actual nanoionic switch of FIG. 2A (depicted schematically in FIG. 1) with the switch in the "off" state (switch is open).

A representative nanoionic switch 100 can be seen in the microphotographs and atomic force photographs of FIGS. 2A, 2B, 2C and 2D. The photographs correspond to the example of FIG. 1. Referring to FIGS. 2A and 2B, which are photomicrographs and atomic force photos, respectively, of a nano-ionic switch 200A, 200B, a chalcogenide ternary 204 is 100 nm thick and an oxidizable electrode 201 and an inert electrode 202 are approximately 2 µm thick. Accordingly, the chalcogenide ternary 204 is much thinner than the electrodes 201, 202.

For an ion current to flow in an electrolyte, the oxidizable electrode 201 is made positive (anode) with respect to the inert electrode 202 and sufficient bias is applied, typically on the order of a few tenths of a volt or more. As an example, for Ag$^+$ saturated GeSe$_2$, the oxidizable electrode 201 is oxidized to form an excess of Ag+ ions within the chalcogenide base glass. The applied field causes the silver positive ions to flow toward the inert electrode 202 through the coordinated hopping mechanism described above. At the inert electrode 202, a reduction reaction occurs by injecting electrons to re-form the metal, such as silver metal. The number of atoms electrodeposited by the reduction of ions will correspond to the number of electrons that participate in the process (supplied by the external circuit, for example a voltage source or some other electronic component). The electrons are supplied by the direct current or alternating current voltage source. Each metal ion undergoing reduction will be balanced by a metal atom becoming oxidized to avoid the formation of an internal electric field due to the build-up of charge. The process continues until the voltage/current limits supplied by the external power source are met. If the current limit is made sufficiently high (about µA), a conductive silver bridge can be formed (electro-deposited) which connects (or bridges) the electrodes 201, 202. Once this conduction path is formed, no further power is required to maintain it. To reverse this process, the electro deposit is made positive by switching the polarity of the voltage with respect to the original oxidizable electrode, causing the dissolution of the metal bridge. During the dissolution of the electro deposit, the balance is maintained by deposition of metal back onto the oxidizable electrode 201. Once the electro deposit has been completely dissolved, the process terminates. For this process to occur, a metal ion-rich anode is required to induce appreciable ion current flow. Further, to be reversible, the opposing electrode (cathode) must be made electrochemically inert (not oxidizable). A person having ordinary skill in the art will appreciate that this is merely example and other materials may be used for the electrodes, such as those described herein.

Figure 6:
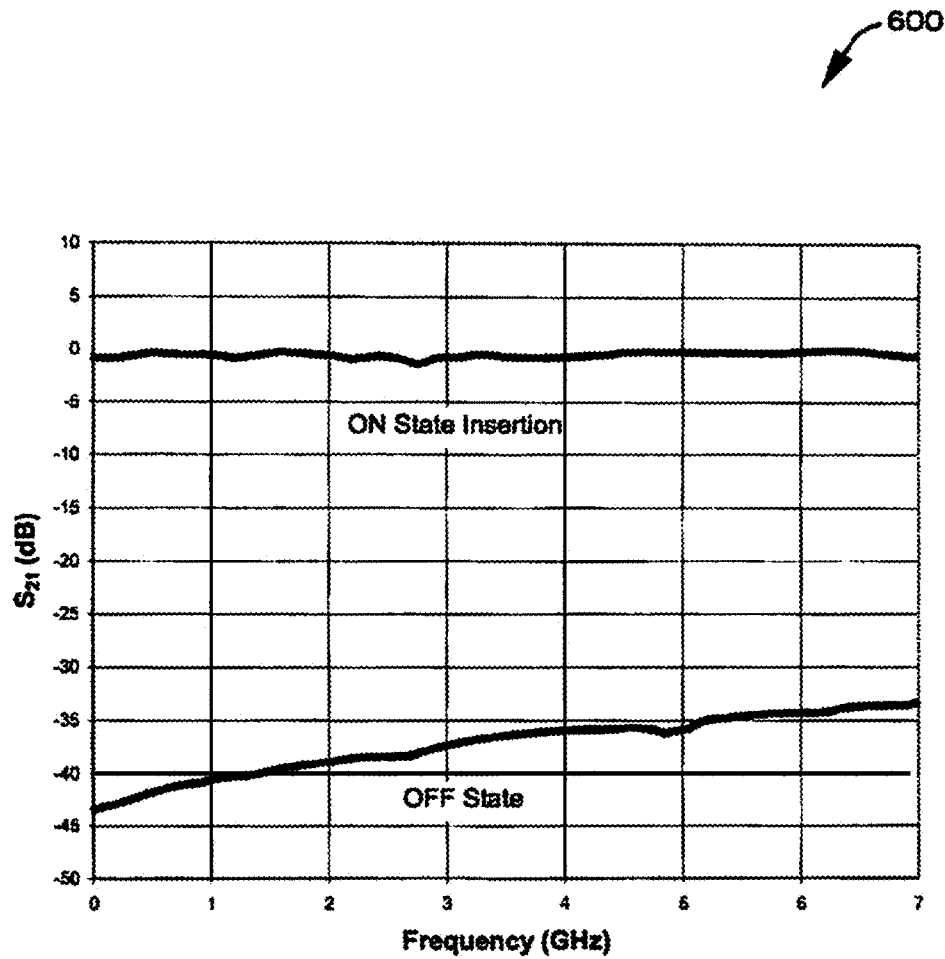
FIG. 6 is a plot of insertion loss (switch closed or "on") and the isolation (switch open or "off") for frequencies between 1 and 6 Ghz.
Figure 7:
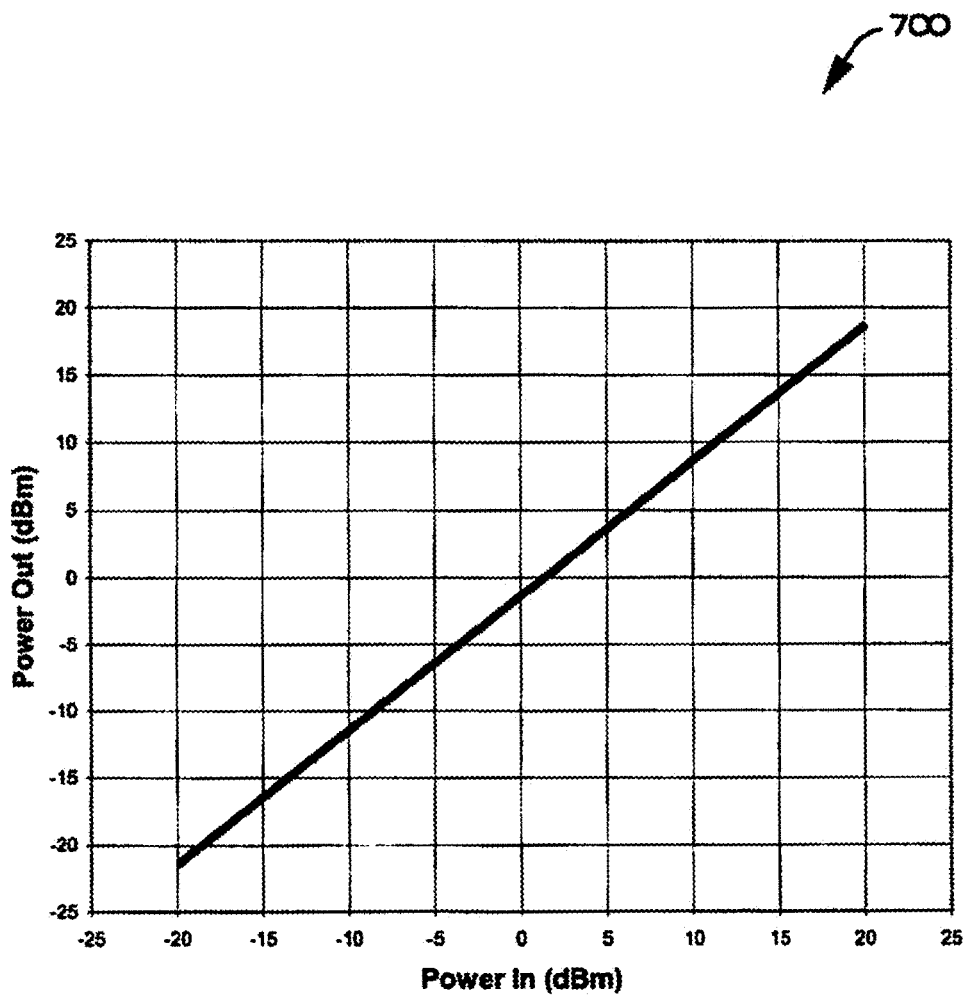
FIG. 7 is a generalized plot of power in versus power out for four frequencies (500 MHZ, 1 GHz, 2 GHz and 4 GHz).

The measured insertion loss ("on"), isolation ("off") and power transfer curves for the nanoionics-based switch 100 (or 100A, 100B, 100C, 200A, 200B hereinafter "the switch 100") are shown in FIGS. 6 and 7, respectively. The switch 100 operates by applying a voltage and a current, such as on the order of µA to mA, and forming a low loss conductive pathway in the base material 179 between the two electrodes 101, 102 (or 105, 106, 121, 122, 151, 152, 201, 201, hereinafter "the electrodes 101, 102"). See FIG. 2D which illustrates the actual growth of the electrodeposits. This process occurs via an oxidation-reduction reaction. Oxidation occurs at the oxidizable electrode 101 to form ions that can migrate into the chalcogenide glass (or the base material 179) while electrons are simultaneously injected at the opposite inert electrode 102. This combination ionic-electronic process induces a reduction reaction within the base material 179 to form a substance capable of "growing" across the gap 104 (or 109, 123, 153, hereinafter "the gap 104") between the electrodes 101, 102. For example, the oxidizable electrode 101 can be metal and may be oxidized to form metallic ions that migrate into the base material 179, such as chalcogenide glass. The reduction reaction within the base material 179 can form metal which responds to an electric field and "grows" across the gap 104 until the power limit applied is reached. No further power is then required to maintain the "on" state of the switch 100. To reverse this process, the polarity of the applied voltage is reversed and the electrochemically grown metal within the gap 104 oxidizes, returning the switch 100 to the "off" state.

FIG. 1D is a schematic cross-sectional view of a nano-ionic switch 100D having the substrate 103, the base material 179, and the electrodes 101, 102. A switch member 187 is electrically connected to a direct current voltage source 183 and the inert electrode 102. The oxidizable electrode 101 is connected to the direct current voltage source 183 opposite the switch member 187. A gap 109 is formed between the electrodes 101, 102. FIG. 1D represents a simple positive bias of the oxidizable electrode 101 with respect to the negative bias of the inert electrode 102. FIG. 1E is a schematic cross-sectional view 100E of the substrate 103, the base material 179, the electrodes 101, 102 and a direct current voltage source 186A. FIG. 1E indicates a positive bias from a voltage source 186A being controlled by the switch member 187A and applied to the inert electrode 102 with the potential of the negative portion of the source being tied to the oxidizable electrode 101. Applying the voltage potential of voltage source 183 across the electrodes 101 and 102 causes electrodeposits to "grow" across the gap 109 at the rate set forth by the following equations, where $v_{Ag}$ is the speed of growth in the base material 179 (or solid electrolyte) and "d" is the size of the gap. The speed of growth, $v_{Ag}$, and the switch time, $t_{switch}$, and resistance, R, of the gap 109 are approximately as follows:

$v_{Ag}$=1 nm/ns $t_{switch}$=d/$v_{Ag}$ where d=10 μm, then $t_{switch}$=10 μs

R=L/$\sigma_m$, for silver $\sigma_m$ the conductivity is 50×$10^5$ S/m, and for electrodeposit in gap 10 μm long, 10 μm wide and 50 nm high, is, 1Ω.

Figure 2C:
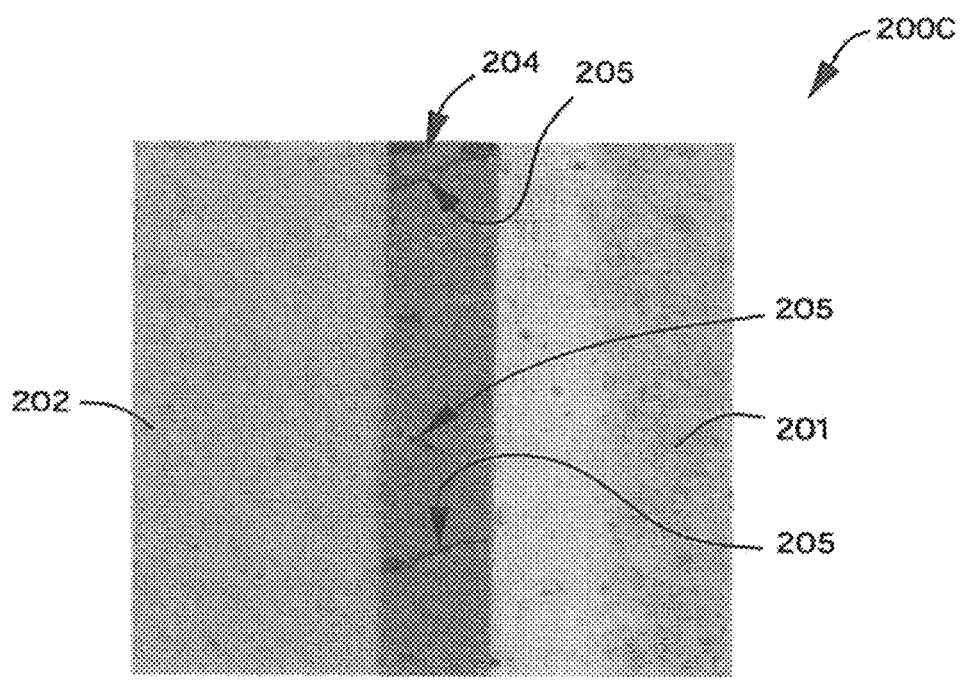
FIG. 2C is a microphotograph of a portion of an oxidizable electrode, inert electrode and a gap therebetween of the nanoionic switch depicted schematically in FIG. 1 in the "on" state (switch is closed).
Figure 2D:
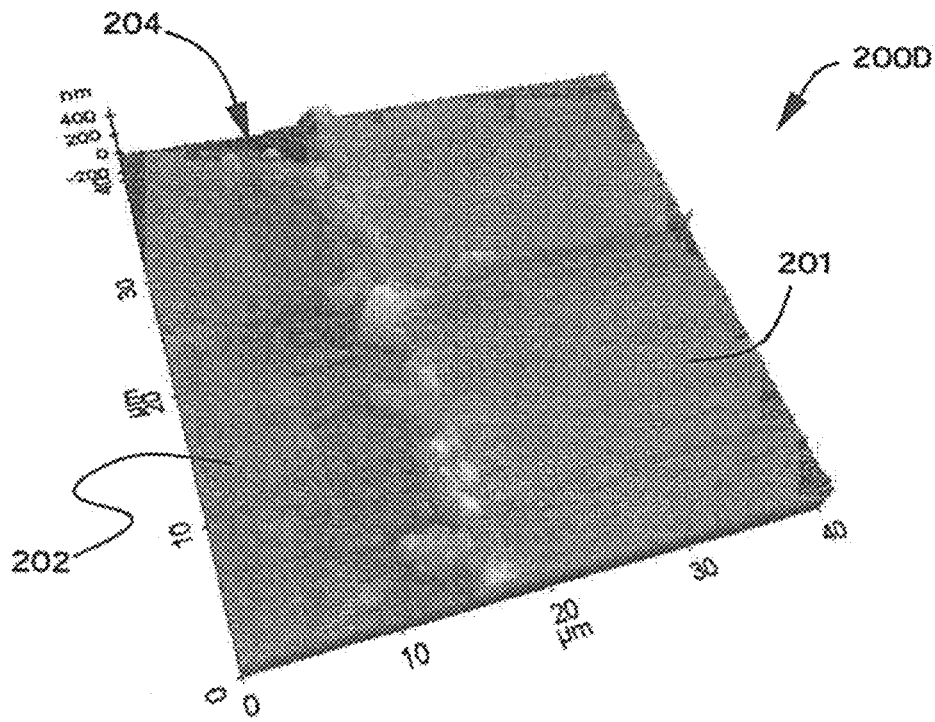
FIG. 2D is an atomic force microscopic image of a portion of the gap and electrodes of a nanoionic switch of FIG. 2C depicted schematically in FIG. 1 in the "on" state (switch is closed).

Referring to FIG. 1D, for a 10 μm gap, the growth of the electrodeposit will take approximately 10 μs. After approximately 10 μs, the switch member 187 may be opened and no further power is required to maintain conductivity of the switch 100D. FIG. 2C is a microphotograph 200C of a portion of the oxidizable electrode 201, the inert electrode 202 and the gap 204 of the nanoionic switch 100 schematically set forth in FIG. 1 in the "on" state (switch is closed). FIG. 2D is an atomic force microscopic image 200D of a portion of the gap 204 of the nanoionic switch 100 of FIG. 1 with the switch in the "on" state (switch is closed). Filaments 205 are shown in the microphotographs traversing the gap 204 in many areas. The filaments 205 are the growth of metal from the oxidizable electrode 201 as illustrated in FIGS. 2C and 2D. In the color micrographs submitted with this disclosure, FIG. 2C shows the filaments as pinkish in some areas and as darker in other areas. FIG. 2D is the atomic force microscope image, and this image illustrates raised structure referred to as dendrites which appears as ridges and cloud-shaped structures. These filaments and ridges (dendrites) shown in FIGS. 2C and 2D are conductive pathways that are established upon the application of bias potential with positive bias applied to the oxidizable electrode 201 and with negative bias applied to the inert electrode 202.

It is instructive to compare FIG. 2A ("off" state microphotograph of the switch 100) with FIG. 2C ("on" state microphotograph of the switch 100) and also to compare FIG. 2B ("off" state atomic force image of the switch) with FIG. 2D ("on" state atomic force image of the switch). FIG. 2A is a microphotograph 200A of a portion of the oxidizable electrode 201, the inert electrode 202 and the gap 204 of the nanoionic switch 100 of FIG. 1 depicting the switch 100 in the "off" state (switch is open). FIG. 2B is an atomic force microscopic image 200B of a portion of the gap 204 and of the electrodes 201, 202 of the switch 100 of FIGS. 1 (and 2A) with the switch in the "off" states (switch is open). The gap 204 which is illustrated in the microphotographs as the darker area in black and white and in the darker reddish areas of the color microphotographs filed with this patent application is the ternary or solid electrolyte which includes the silver-germanium-selenium ternary. Germanium and Selenium are a binary into which silver is photodissolved creating a ternary as described herein.

As illustrated in FIG. 1E, the switch 100E may be returned to its "off" state by applying positive voltage from the source 186A to the inert electrode 102 and by applying (throwing the switch member 187A) the negative voltage from the source voltage 186A for a sufficient time as dictated by the switching time as stated above. The switch member 187A controls the application of reverse bias in FIG. 1E.

Figure 1F:
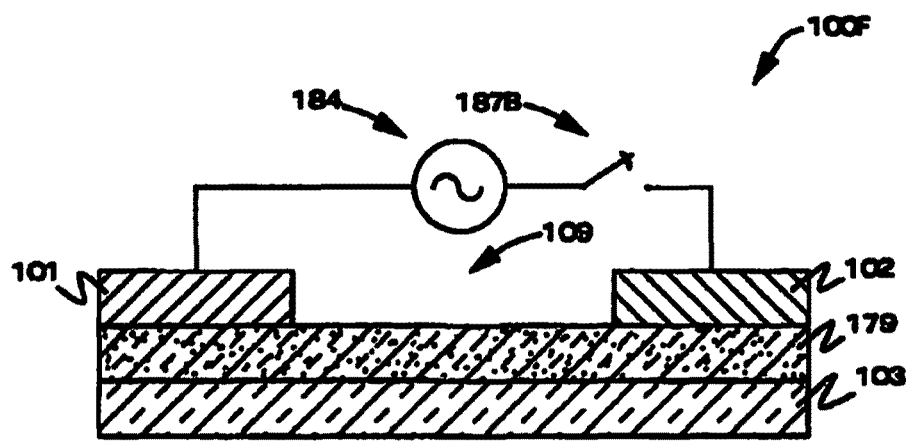
FIG. 1F is a schematic cross-sectional view of a substrate, solid electrolyte, electrodes, switch and an alternating voltage source.

FIG. 1F is a schematic cross-sectional view 100F of the substrate 103, the base material (or solid electrolyte) 179, the electrodes 101, 102, a switch member 187B and an alternating current power supply 184 applied across the electrodes 101, 102. Referring to FIG. 1F, a sinusoidal voltage source 184 may be applied (controlled by the switch member 187B) to the electrodes 101, 102. Once the growth of metal has been established across the gap 109 and/or in the base material (or ternary) 179, the switch member 187 can be opened and no further power is necessary. The switch 100 disclosed herein is a nonvolatile switch meaning once the metal has filled the gap 104, then no further power is required to maintain the switch 100 in the closed position. A sinusoidal signal may be passed through the switch 100 at frequencies greater than the switching time and/or having an rms (root mean square) voltage below the voltage necessary to activate the switch 100.

The switch 100 exhibits switching times according to the equation above and the switching times are on the order of less than 1-10 microseconds (μs) which equate to frequencies of 1 MHz to 100 kHz. See FIG. 8. However, the duration and voltage of the half-cycle of those frequencies should be considered lest the switch 100 might actuate inappropriately. Therefore, for a sinusoidal waveform being passed through the switch 100, the specific switch time for the particular switch should be considered and the root mean square voltage (hereinafter "rms voltage") for the half cycle should be less than the actuation voltage (closing the switch). In addition, the rms voltage for the negative half cycle should be less than the reset actuation voltage (opening the switch). For example, if the period of the incoming signal being passed through the nonvolatile switch is too long (the frequency is too low), then the switch 100 could change states and reset with each cycle of the input signal.

Figure 3:
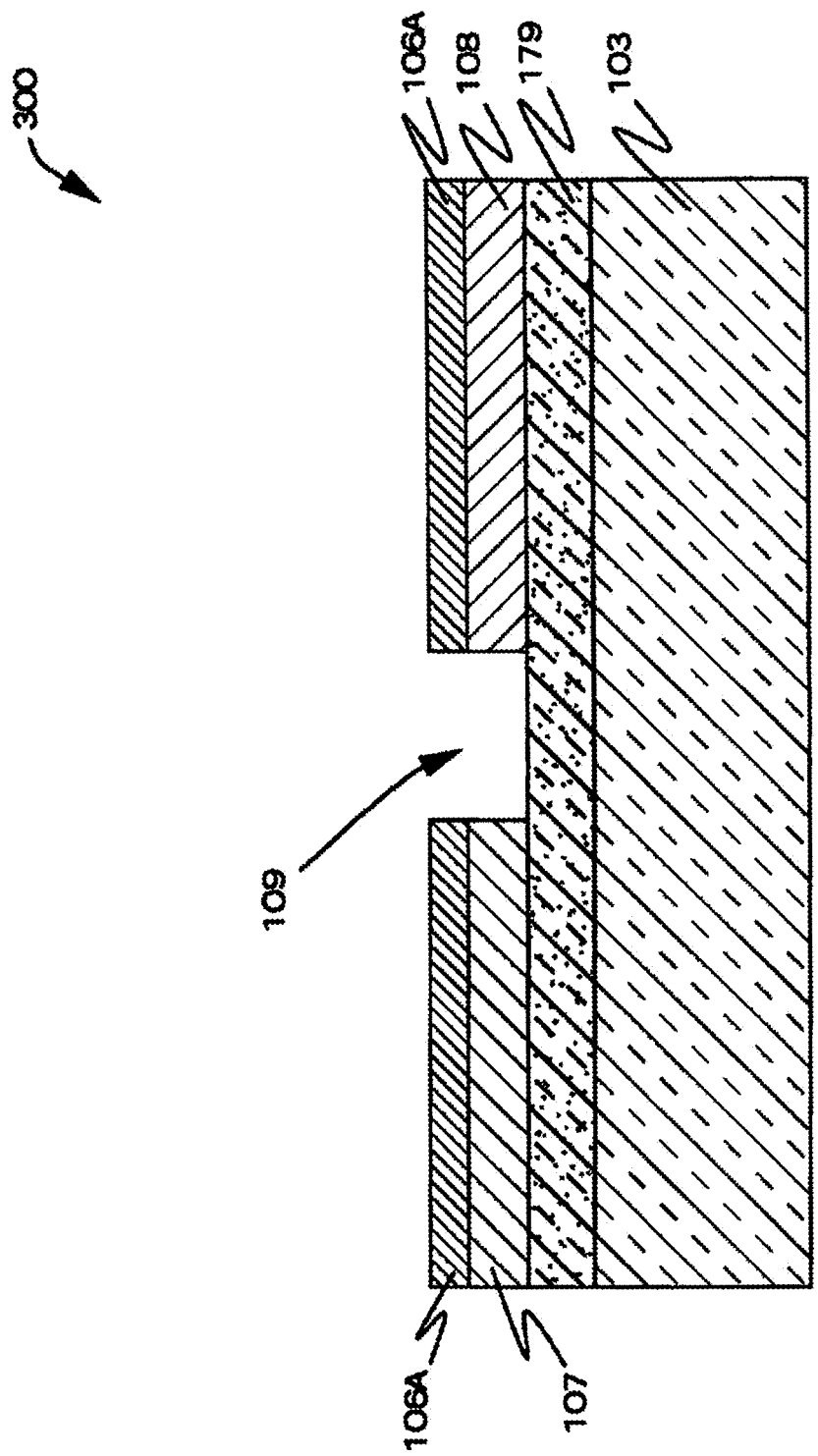
FIG. 3 is a schematic cross-sectional view taken along the lines 3-3 of FIG. 2 illustrating a substrate, a chalcogenide glass layer, and metallic plated electrodes.
Figure 3A:
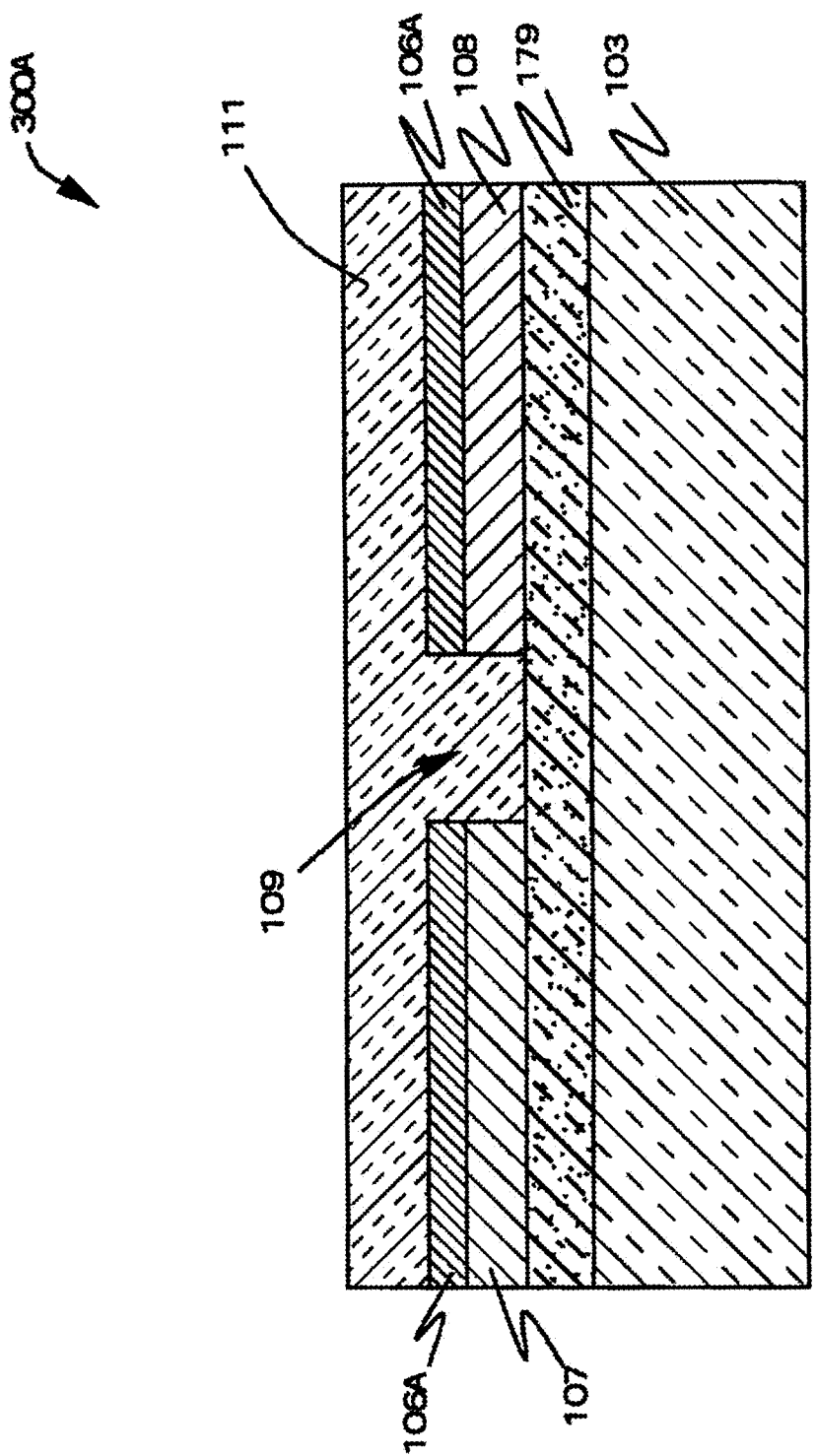
FIG. 3A is schematic cross-sectional view illustrating the substrate, the metallic plated electrodes and a passivation layer above the electrodes and traversing the gap between the electrodes.

FIG. 3 is a cross-sectional view 300 taken along the lines 3-3 of FIG. 2 illustrating the substrate 103, the base material (or ternary) 179, the oxidizable electrode 107 and the inert electrode 108. FIG. 3A is cross-sectional view 300A similar to FIG. 3 along with a passivation layer 111 above the electrodes 107, 108 and traversing the gap 109 between the electrodes 107, 108. FIG. 3A also illustrates the substrate 103, the base material (or ternary) 179, the metallic plated 106A oxidizable electrode 107 and the metallic plated 106A inert electrode 108. The metallic plating 106A can be added to the electrodes 107, 108 to reduce ohmic contact losses.

The electrodes 107, 108 can be dissimilar metals and can be plated to a thickness of, for example, 1.5-2.0 μm. As a non-limiting example, the base material (or ternary) 179 may have a thickness of approximately 500 μm as illustrated in FIG. 3A, and the gap 109 may be approximately 10 μm as measured between the electrodes 107, 108. Of course, those having ordinary skill in the art will appreciate that other separation distances may be utilized, such as those in the range of 0.1 to 500 μm.

Within the gap 109, a thin film (for example, about 100 nm) of silver-saturated $GeSe_2$ glass (as an example) can be deposited which represents the active area of the switch 100. Alternatively, the silver saturated glass is deposited first over a wide area of the substrate 103 and then the electrodes 107, 108 are deposited thereover. A transmission line can taper to a higher impedance (narrowed width, 10 μm) transmission line toward the gap 109. The tapering effect can help to reduce capacitive coupling in the switch in the "off" state, but remains the primary source of loss in the "on" state (due to a higher resistance because of a narrower channel). The passivation layer 111 can be silicon dioxide positioned atop the "active" area to provide protection.

By way of example, to operate the switch 100, a voltage of nominally 0.3-1V and a current limit of 10 mA were used. The resistance in the "on" state was approximately 10Ω.

Higher voltages induced faster growth rates, whereas higher current limits reduced the overall resistive loss of the electrochemically grown metal, but resulted in higher power requirements to operate the switch 100.

The application of a positive voltage relative to the inert electrode 108 induces metallic growth and enables the device to be turned "on." Reversing polarity of the applied voltage removes the electrochemically grown silver and forces the device into the "off" state. FIG. 2C is a microphotograph of the conductive metallic pathways that form when the device is "on". FIG. 2D is an atomic force microscope image after the switch 100 has been closed and shows that much of the metallic growth occurs on the surface of the thin film of the ternary 179.

To measure the microwave performance of the switch 100, test samples were individually diced and mounted onto a brass mounting fixture. The circuit was connected to an Agilent E8361A Vector Network Analyzer in order to measure "on" state insertion loss and "off" state isolation. An Agilent E3646A DC Power Supply was utilized to provide the necessary voltage/current to change the state of the device (nominally 1V/10 mA ("on") and −1V/10 mA ("off")). A plot of these results is shown in FIG. 7 for the nanoionic switch 100. The insertion loss of the switch in the "off" state is better than −0.5 dB over the DC (zero hertz) to 6 GHz range (commercial ISM Band), while the isolation in the "off" state is better than −35 dB. A −0.5 dB insertion loss equates to approximately a 5.9% energy loss with the switch inserted in the circuit meaning that the switch is closed. Similarly, a −35 dB isolation loss equates to approximately 1.8% energy loss with the switch open. These measured results are comparable to MEMS and solid state-based RF switch performance in the same frequency range as indicated in FIG. 8.

Power measurements were performed using an Anritsu ML2437A power meter and Anritsu MG3691B signal generator. The switch 100 was mounted on the same brass mounting fixture while various frequencies (500 MHZ-4 GHz) of varying power were fed into the switch 100. Attenuation pads at the input and output to the switch 100 were used to reduce signal reflection within the system. The results are illustrated in FIG. 7 by the dark linear line. All of the frequencies 500 M Hz, 1 G Hz, 2 G Hz, 3 G Hz and 4 G Hz) were within the width of the dark line of the plot which indicates linearity over a wide band of frequencies.

Figure 4:
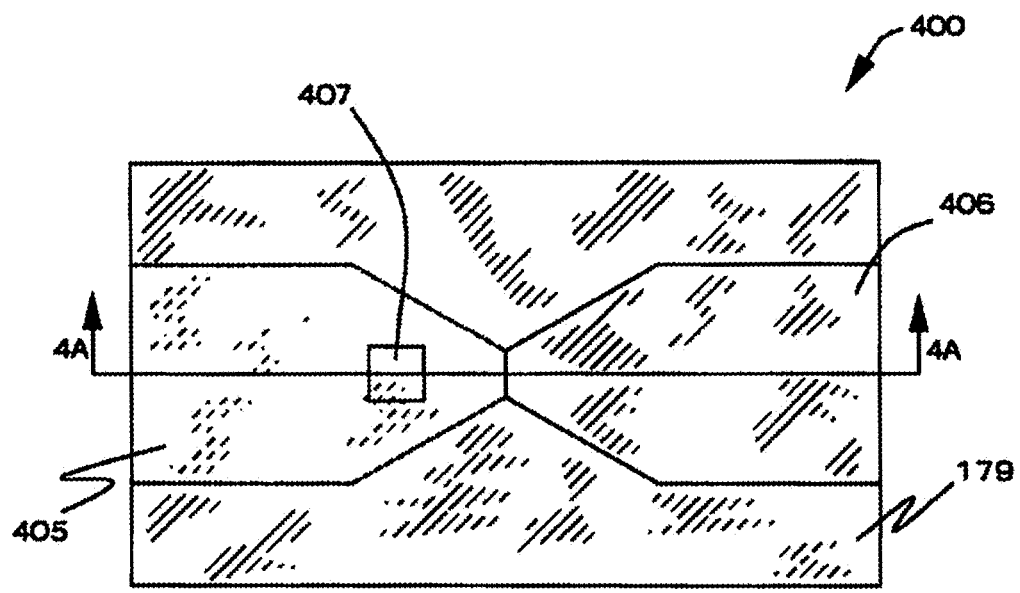
FIG. 4 is schematic top view of a nanoionic capacitor.
Figure 4A:
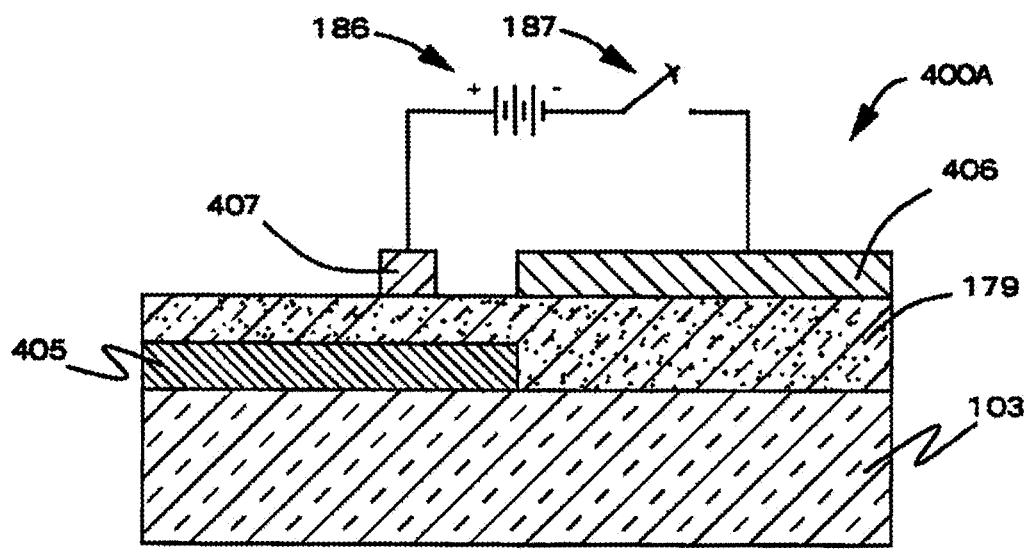
FIG. 4A is a schematic cross-sectional view of the nanoionic capacitor of FIG. 4 illustrating electrodes.

FIG. 4 is schematic top view of a first example of nanoionic capacitor 400. FIG. 4A is a schematic cross-sectional view 400A of the nanoionic capacitor 400 of FIG. 4 illustrating electrodes 407 (anode, oxidizable electrode) and 406 (cathode, inert). As described above, direct current voltage is applied to the oxidizable electrode 407 and the inert electrode 406 via the direct current voltage source 186 for a period of time to grow (electrodeposit) the metal, such as silver, from the oxidizable electrode 407 to the inert electrode 406 across gap 109A, thus closing the switch 100. Once the switch member 187 is closed then the nanoionic capacitor 400 is formed between conductive plate 405 and the plate formed by the electrodeposit which has filled the gap 109A. See FIG. 2D for an illustration of the switch 100 with the electrodeposit "grown" across the gap 204. Once the electrodeposit has been formed, it acts as a capacitor plate as does silver anode 407. The capacitor 400 can then be used for any function normally performed by capacitors such as in band pass filters, coupling capacitors and the like.

FIG. 4B is a top schematic view of a plate (lower plate) 400B that can be utilized in the capacitor 400. The lower plate 400B includes transmission lines 420, 440 and a narrower section 430. The narrowed section 430 of plate 400B can have the same shape as the electrodeposited plate in the gap 109. In this example, the nanoionic switch 100 of FIG. 3 can be used with the lower plate 400B depicted in FIG. 4B and can be separated by a dielectric. FIG. 4C is a top schematic view of one of the two capacitor plates, namely an upper plate 400C that may be used in this example of the nanoionic capacitor 400. FIG. 4C illustrates the oxidizable electrode 107 separated by the gap 109 from the inert electrode 108. FIG. 4D is a top schematic view 400D of the plates 400B, 400C (of FIGS. 4B and 4C) illustrated in an overlapping position crossing each other in an orthogonal relationship. FIG. 4E is a cross-sectional view 400E of the capacitor taken along the lines 4E-4E of FIG. 4D illustrating the upper plate 400C (formed from the growth of the electrodeposit (not shown)) and the lower plate 400B. Shoulders 431, 432 are illustrated in FIGS. 4D and 4E and the shoulders 431, 432 represent the taper of the lower plate 400B of the capacitor 400. When the electrodeposit is grown two plates exist, the first plate being the electrodeposit and the second plate being the narrow section 430 of the lower plate 400B. It should be noted that the plates 400B, 400C of the example of FIGS. 4B-4E may be rectangular in cross-section and/or similarly shaped. Further, it should be noted that FIG. 4C can be similar in shape to the profiles illustrated in FIG. 2 and in FIG. 1A. As indicated herein the shape of the wider portions of the conductors 420, 440 and their tapered (unnumbered) and narrow portion 430 can be similar to the wider portions 105, 106, the tapered portions 107A, 108A and the narrow portions 107, 108. See FIGS. 4B-4E and FIGS. 1A and 2. The plates just described are separated by a dielectric 490. No dielectric may be required if the substrate 103 is a dielectric and the metallic doping of the ternary that does not extend therethrough is a dielectric.

FIG. 6 is a plot 600 of insertion loss (switch closed or "on") and the isolation (switch open or "off") for frequencies between 1 and 6 GHz. FIG. 7 is a generalized plot 700 of power in versus power out for four frequencies (500 MHZ, 1 GHz, 2 GHz and 4 GHz). From FIG. 7, it can be seen that devices typically demonstrated linearity over the range of measured power from −20 dBm to +20 dBm, with device breakdown typically occurring at about 400-500 mW. Further, no change is evident in the power transfer curve at different frequencies of operation, demonstrating the device's wide bandwidth operation potential.

The speed of operation of the nanoionic switch 100 can be a function of the distance the electrodeposit has to traverse. Or, put another way, the electrodeposit has to grow a certain distance within the ternary or on top of the ternary (or base material 179). That is, the wider the gap 109 between the electrodes 101, 102, the longer the response time of the switch 100. Although the switching speed was not directly measured, results inferred from M. N. Kozicki, M. Yun, L. Hilt, A. Singh, "Application of programmable resistance changes in metal-doped chalcogenides," Proceedings of the 1999 Symposium on Solid State Ionic Devices, Electrochemical Society Proceeding, Vol. 99-13, p. 298 (1999), indicate that the electrodeposition rate of silver within a chalcogenide glass occurs at a velocity of approximately 1 nm/ns. Therefore, for a 10 μm gap, a switching speed of around 10 μs is expected. Obviously the smaller the gap size, the faster the switch operation, but other considerations such as "off" state isolation limit the optimization of speed, at least for a coplanar-type structure.

Figure 5:
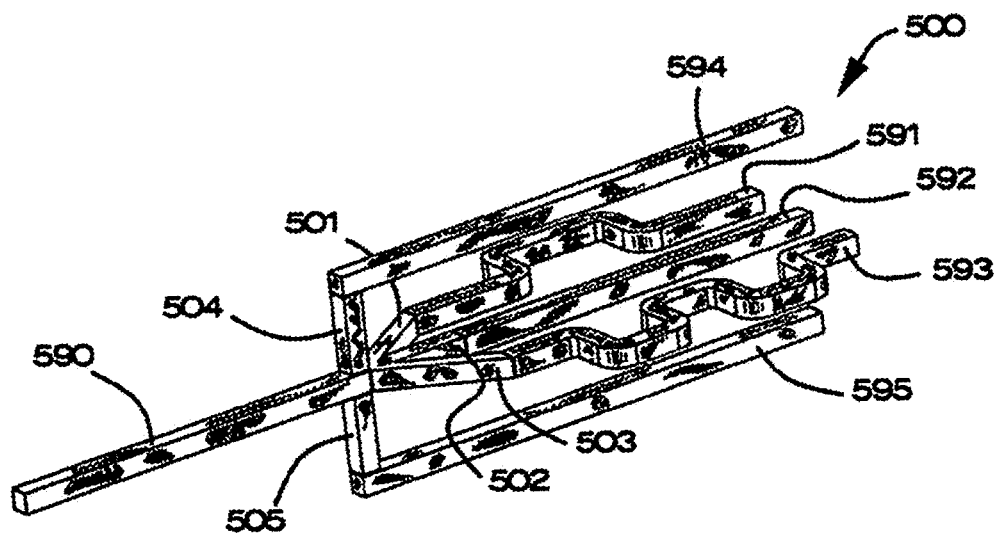
FIG. 5 is a schematic of a vertical and horizontal switch to various lines having different lengths to accommodate phase shifting.
Figure 5A:
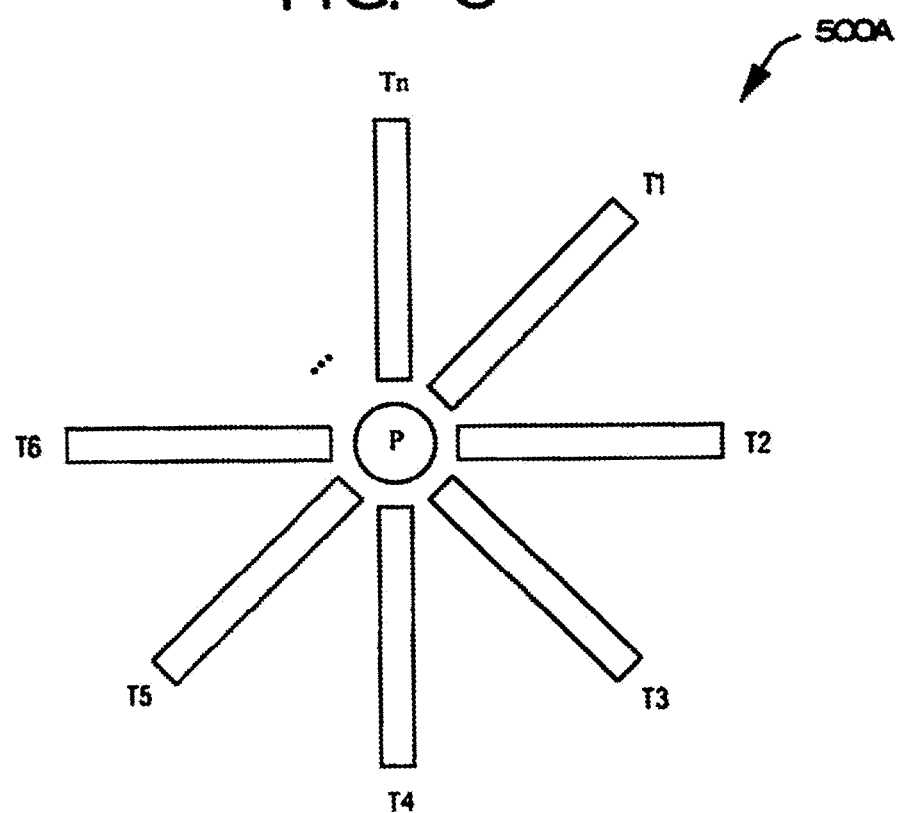
FIG. 5A is a schematic of a single pole "N" throw nanoionic switch.

FIG. 5A is a schematic 500A of a single-pole, "N" throw nanoionic switch. In FIG. 5A, "P" represents the pole or anode and T1 through Tn represents "N" possible throws.

Since the active switching element is comprised of simply a thin film area, the addition of extra electrodes (ports or throws "N") in contact with the active area makes possible the creation of SPNT (single-pole-n-throw-switches), as shown in the diagram of FIG. 5A. Application of the necessary voltage across the electrodes results in a conductive pathway which can be formed/dissolved amongst one of several different paths limited only by available space and maximum coupling level requirements. Further, the ability to deposit "vias" of this nanoionic material allows for the formation of multilayer control circuits. "Vias" are the through-hole paths to other surfaces of an integrated circuit having multiple layers. Use of a switching network in a horizontal and a vertical fashion has the advantage of compacting circuit footprints and reducing overall circuit losses. The disclosure of the nanoionic switch 100 herein represents an unprecedented ease of integration.

FIG. 5 illustrates a potential SP5T nanoionic switch 500, showing multiple horizontal, as well as vertical, switching paths. One such application for the switch 500 can be in low-loss phased array technology. For conventional discrete phase shifters based on a solid state or MEMS approach, approximately 2N switches is required for an N-bit phase shifter, with 2-3 control lines per switch, contributing to the overall loss and complexity of the circuit. Advantageously, implementation of the nanoionic topology described herein results in an N-bit phase shifter with only one nanoionic switch and N+2 control lines. A control line may be required for each of the N-bits. Additionally, a control line may be necessary to switch positive potential to the pole (oxidizable electrode) and another control line is needed to switch negative potential for a bus interconnected with the phase shifters (inert electrode). This example discloses the structure necessary for minimizing losses as the insertion loss of each of the phases is low and the line losses (and not switch losses) will be the primary contributor to total phase shifter loss.

Referring to FIG. 5, the SP5T nanoionic switch 500 is formed as first throw 501, second throw 502, third throw 503, fourth throw 504, and fifth throw 505. Each of these throws 501, 502, 503, 504 can be a nanoionic switch wherein an electrodeposit is grown over and through respective horizontal or vertical gaps. Each switch operates between an (anode, oxidizable pole) 590 and a first delay line 591, a second delay line 592, a third delay line 593, a fourth delay line 594, and a fifth delay line 595.

Figure 9:
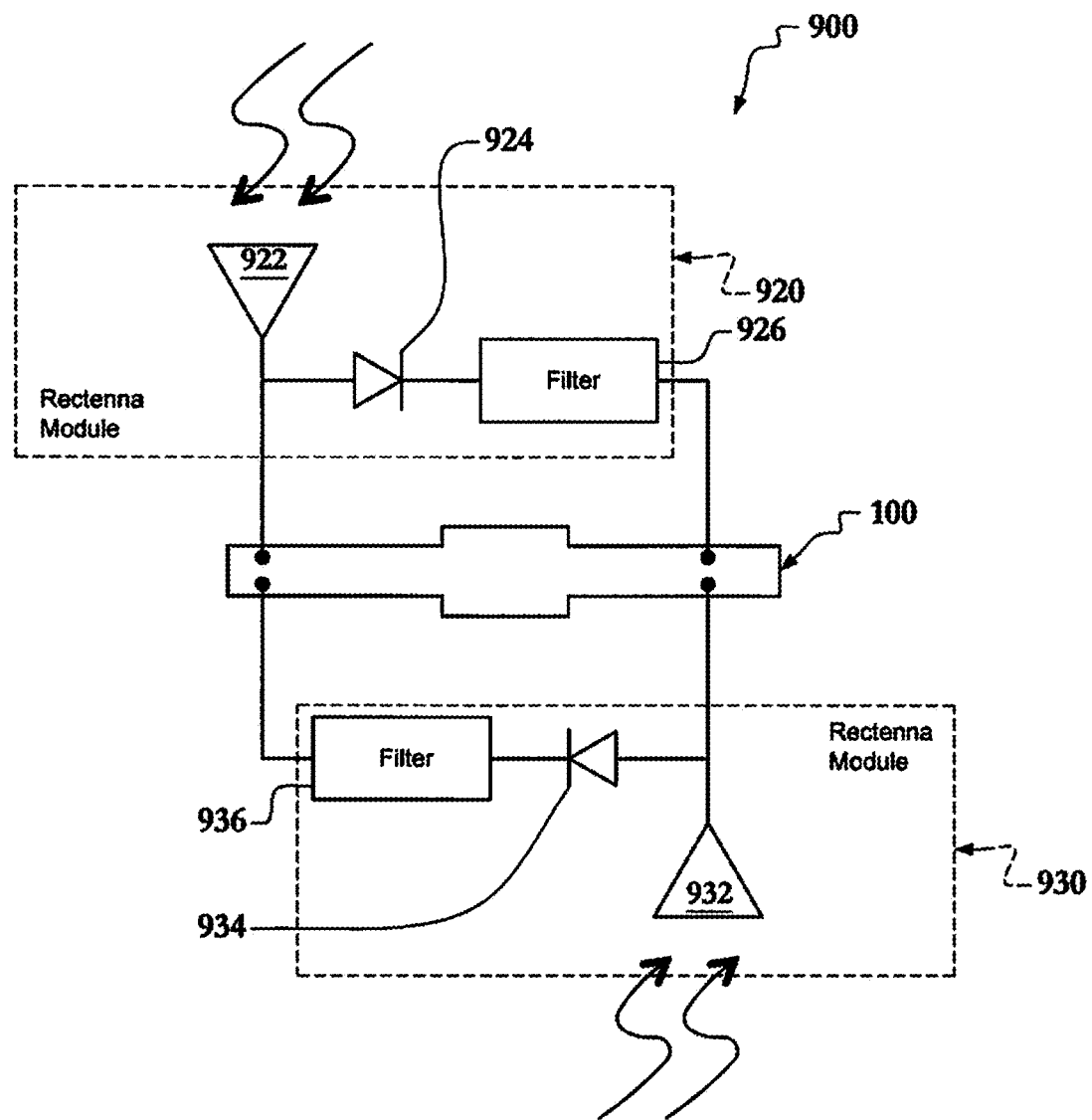
FIG. 9 illustrates a first rectenna module and a second rectenna module electrically connected to a nano-ionic switch in an embodiment of the disclosure.

FIG. 9 illustrates a system 900 that may be utilized with a nano-ionic switch as previously mentioned herein, such as the nanoionic switch 100 (or 100A, 100B, 100C, 200A, 200B, 500, together hereinafter "the switch 100"). As shown in FIG. 9, the switch 100 may be positioned between a first rectenna module 920 and a second rectenna module 930. As mentioned, the switch 100 may comprise the elements of the switch 100 as set forth herein, including having the oxidizable electrode 101 and the inert electrode 102 positioned on chalcogenide glass such that the gap 109 exists between the oxidizable electrode 101 and the inert electrode 102. A conductive bridge can be formed at the gap 109 between the electrodes 101, 102 upon activation application of voltage on the switch 100.

Advantageously, the embodiment of FIG. 9 may be used without an active voltage source. For example, no on-board power may be required to operate the switch 100. Instead, the rectenna modules 920, 930 may be connected to the switch 100 and permit control of the switch 100, such as closing or opening the switch 100, from a location remote from the switch 100 and/or the rectenna modules 920, 930.

In an embodiment, the switch 100 functions by way of a wireless, contact-less induced change of polarity on the electrodes 101, 102 to enable either a highly conductive or a highly resistive path between the electrodes of the switch 100.

For example, each of the rectenna modules 920, 930 may comprise one or more components to receive a signal, such as an antenna, and one or more transducers. In an embodiment, the rectenna modules 920, 930 comprise a rectifying element, such as a nonlinear rectifying element or nonlinear rectifier. The components and/or transducers of the rectenna modules 920, 930 may be electrically connected to the nono-ionic switch 100. The rectenna modules 920, 930 may have one or more devices and/or features capable of receiving a first type or frequency of energy and converting or transforming the first type of energy to electrical energy to control the switch 100. In an embodiment, the rectenna modules 920, 930 may receive microwave energy or a radio frequency signal (hereinafter "RF signal"), such as radio frequency energy, and convert the microwave energy or the RF signal to electrical current, such as alternating electrical current or direct electrical current.

For example, the first rectenna module 920 may have a first antenna 922, a first diode 924, and a first filter 926. The second rectenna module 930 may have a second antenna 932, a second diode 934, and a second filter 936. The first filter 926 may be positioned such that the first filter 926 is positioned between one of the electrodes 101, 102 of the switch 100 and the first diode 924. The second filter 936 may be positioned between one of the electrodes 101, 102 of the switch 100 and the second diode 934. The filters 926, 936 may be low pass filters configured to attenuate or suppress high-frequency signals received therein. The filters 926, 936 may be capacitive or inductive low pass filter as non-limiting examples. A person having ordinary skill in the art will appreciate the filters 926, 936 may be configured based on application of the switch 100 and/or the rectenna modules 920, 930.

The antennas 922, 932 may be any type of antennas to receive the first type or frequency of energy. For example, in order to receive the RF signal, the antennas 922, 932 may be microwave antennas, broadband antennas, large antenna arrays, circular polarized antennas, microstrip antennas, such as microstrip square-patch antennas, or any other type of antenna capable of receiving the first type of energy, such as the RF signal. The broadband antenna may enable relatively high frequency RF signals to be received while an antenna array can increase incident power delivered to the first diode 924 or the second diode 934, respectively. In an exemplary embodiment, the antennas 922, 932 may be a circular antenna, such as a microstrip circular-sector antenna. The circular antenna can offer power reception with less polarization mismatch. For example, the circular antenna may suppress radiations of the second and third harmonics such that a filter, such as the filters 926, 936, between the first antenna 922 or the second antenna 932, and the first diode 924 or the second diode 934, may not be necessary.

The first diode 924 and the second diode 934 may comprise a diode, such as a Schottky diode, an IMPact ionization Avalanche Transit-Time diode ("IMPATT diode") or other type of diode that will be appreciated by those having ordinary skill in the art. As an example, the first diode 924 and the second diode 934 may be any device having an asymmetric transfer characteristic with low resistance to current flow in one direction and a high resistance to current flow in the other direction.

In use, a first wireless signal, such as the RF signal, may be transmitted from a location remote from the rectenna modules 920, 930. The first wireless signal can be received at the first rectenna module 920, such as by the first antenna 922. The first antenna 922 can be electrically connected to the first diode 924 and the first filter 926 to convert the RF signal into electrical energy and to apply a first bias based on the RF signal across the nano-ionic switch 100. The first bias can change a state of the nano-ionic switch 100 from a first state to a second state, such as from an "off" state to an "on" state. For example, as shown in FIGS. 1 and 2, the oxidizable electrode 101 is made positive (anode) with respect to the inert electrode 102 if sufficient bias is applied.

As an example, the oxidizable electrode 101 is oxidized to form an excess of metal ions within the chalcogenide base glass (or base material 179). The applied field causes the positive metal ions to flow toward the inert electrode 102 through the coordinated hopping mechanism described above. At the inert electrode 102, a reduction reaction can occur by electrodepositing the metal and eventually forming a conductive bridge across the gap 109 between the electrodes 101, 102. The switch 100 can now be considered to be in the "on" state and can be maintained at this state with little or no continued or additional voltage. For example, without further electrical power and without further or continued receipt of the first wireless signal, the switch 100 can remain in the "on" state.

In order to revert or change the state of the switch 100 from the "on" state to the "off" state, a second wireless signal can be transmitted from a location remote from the rectenna modules 920, 930 to, for example, the second rectenna module 930. The second wireless signal can be received at the second rectenna module 930, such as by the second antenna 932. The second wireless signal can be at a different frequency from the first wireless signal. Accordingly, the first antenna 922 can be tuned to receive signals within a first frequency range, and the second antenna 932 can be tuned to receive signals within a second frequency range, different than the first frequency range. The second antenna 932 can be electrically connected to the second diode 934 and the second filter 936 to convert the RF signal into electrical energy and to apply a second bias based on the RF signal across the nano-ionic switch 100. The second bias can change a state of the nano-ionic switch 100 from the second state to the first state, such as from an "on" state to an "off" state. The second bias may be reversed, negative or opposite with respect to the first bias. For example, as shown in FIGS. 1 and 2, the electrochemically grown metal within the gap 109 oxidizes, returning the switch 100 to the "off" state. For example, the oxidizable electrode 101, 201 is made positive with respect to the inert electrode 102, 202 until the gap 109 again is formed between the electrodes 101, 102.

Figure 10:
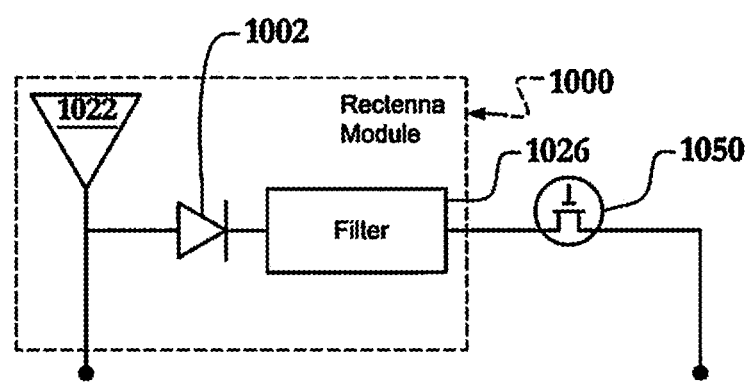
FIG. 10 illustrates a rectenna module and a polarity switch electrically connected in an embodiment of the disclosure.

FIG. 10 illustrates an embodiment of a rectenna module 1000 which may be utilized in the embodiment of FIG. 9. In an embodiment, the rectenna module 1000 may replace the rectenna modules 920, 930. The rectenna module 1000 may comprise one or more components to receive a signal, such as an antenna, and one or more transducers. In an embodiment, the rectenna module 1000 can comprise a rectifying element, such as a diode 1002. The components of the rectenna module 1000 may be electrically connected to the nono-ionic switch 100. The rectenna module 1000 may have one or more devices and/or features capable of receiving a first type or frequency of energy and converting or transforming the first type of energy to electrical energy to control the switch 100 (shown in FIG. 9). In an embodiment, the rectenna module 1000 may receive the RF signal and convert the RF signal to electrical current, such as alternating electrical current or direct electrical current. The rectenna module 1000 may have an antenna 1022, the diode 1002 and a filter 1026. The filter 1026 may be positioned such that the filter 1026 is positioned between one of the electrodes of the switch 100 and the diode 1002. The filter 1026 may be low press filters configured to attenuate or suppress high-frequency signals received therein.

In use, the rectenna module 1000 may receive the RF signal, such as at the antenna 1022, at a first frequency to apply a first bias based on the RF signal across the nano-ionic switch 100. The first bias can change a state of the nano-ionic switch 100 from a first state to a second state, such as from an "off" state to an "on" state. For example, as shown in FIGS. 1 and 2, the oxidizable electrode 101, 201 is made positive (anode) with respect to the inert electrode 102, 202 if sufficient bias is applied. As an example, the oxidizable electrode 101 is oxidized to form an excess of metal ions within the chalcogenide base glass (or base material 179). The applied field causes the positive metal ions to flow toward the inert electrode 102, 202 through the coordinated hopping mechanism described above. At the inert electrode 102, 202, a reduction reaction occurs by injecting electrons to re-form the metal and eventually form a conductive bridge across the gap 109 between the electrodes 101, 102. The switch 100 can now be considered to be in the "on" state and can be maintained at this state with little or no continued or additional voltage. For example, without further electrical power and without further or continued receipt of the first wireless signal, the switch 100 can remain in the "on" state.

In order to revert or change the state of the switch 100 from the "on" state to the "off" state, the first wireless signal may be sent again to the rectenna module 1000. Alternatively, the second wireless signal may be sent to the rectenna module 1000 comprising a microwave or the RF signal at a frequency different than the first wireless signal. In either instance, the first wireless signal or the second wireless signal can be transmitted from a location remote from the rectenna module 1000 and the antenna 1022. Advantageously, the rectenna module 1000 may include a polarity switch 1050 electrically connected to the antenna 1022, the diode 1002 and the filter 1026 as shown in FIG. 10. The polarity switch 1050 can be configured to control the bias across the nano-ionic switch 100. As an example, the polarity switch 1050 may apply a second bias that is a reverse or opposite of the first bias upon the antenna 1022 receiving the first wireless signal again (e.g. a second time or twice in a row) or receiving the second wireless signal. As mentioned above, the second bias can change the state of the switch 100, such as change a state of the switch from an "on" state to an "off" state. The second bias can, for example, as shown in FIGS. 1 and 2, cause oxidize the electrochemically grown metal within the gap 109, returning the switch 100 to the "off" state. The oxidizable electrode 101, 201 can be made positive with respect to the inert electrode 102, 202 until the gap 104 again is formed between the electrodes 101, 102.

The polarity switch 1050, therefore, permits use of the nano-ionic switch 100 with only one rectenna module 1000, in at least an embodiment. At a minimum, the polarity switch 1050 permits control of the switch 100 to move from an "on" state to an "off" state and back again with only the use of a single rectenna module 1000. The polarity switch 1050 may be any device or combination of devices to permit a first bias and a second bias, the second bias being opposite the first bias. Accordingly, the polarity switch 1050 is configured to apply a positive bias to the oxidizable electrode 101 in certain instances as set forth herein, and the polarity switch 1050 can apply a negative bias on the oxidizable electrode 101 in other instances. For example, the polarity switch 1050 may apply a positive bias on the oxidizable electrode 101 upon receipt of the first wireless signal, and the polarity switch 1050 may apply a negative bias on the oxidizable electrode 101 upon receipt of the first wireless signal again or receipt of the second wireless signal at the antenna 1022.

Those skilled in the art will readily recognize that the invention has been set forth by way of examples only and that changes may be made to the invention without departing from the spirit and scope of the appended claims.

The invention claimed is:

1. An apparatus comprising:
   a nanoionic switch having a first state and a second state;
   at least one rectenna module, comprising an antenna and a rectifier, coupled to the nanoionic switch; and
   wherein the rectenna module permits operation of the nanoionic switch without onboard power.

2. The apparatus according to claim 1, wherein a signal at a first frequency or a signal at a second frequency changes the state of the nanoionic switch from the first state to the second state.

3. The apparatus according to claim 2, wherein the rectenna module receives and converts a signal at a first frequency or a signal at a second frequency into electrical charges.

4. The apparatus according to claim 3, wherein the electrical charges change the nanoionic switch from a first state to a second state.

5. The apparatus according to claim 1, wherein the nanoionic switch further comprises an oxidizable electrode and an inert electrode with a gap between the oxidizable electrode and the inert electrode.

6. The apparatus according to claim 5, wherein the inert electrode and the oxidizable electrode are positioned on chalcogenide glass.

7. The apparatus according to claim 6, wherein a conductive bridge is formed at the gap between the oxidizable electrode and the inert electrode, without any power source.

8. The apparatus according to claim 7, wherein electrical current is directed to the oxidizable electrode to change the state of the nanoionic switch.

* * * * *